(12) United States Patent
Chang et al.

(10) Patent No.: US 10,867,202 B2
(45) Date of Patent: Dec. 15, 2020

(54) METHOD OF BIOMETRIC AUTHENTICATING USING PLURALITY OF CAMERA WITH DIFFERENT FIELD OF VIEW AND ELECTRONIC APPARATUS THEREOF

(71) Applicant: Samsung Electronics Co., Ltd, Suwon-si (KR)

(72) Inventors: Wonsuk Chang, Suwon-si (KR); Hyeongwook Yang, Suwon-si (KR); Juwoan Yoo, Suwon-si (KR); Kwanghyun Lee, Suwon-si (KR); Heejun Lee, Suwon-si (KR); Tushar Balasaheb Sandhan, Suwon-si (KR); Yangsoo Lee, Suwon-si (KR); Jiyoon Park, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/284,968

(22) Filed: Feb. 25, 2019

(65) Prior Publication Data
US 2019/0266427 A1    Aug. 29, 2019

(30) Foreign Application Priority Data

Feb. 23, 2018    (KR) .......................... 10-2018-0022275

(51) Int. Cl.
*H04N 5/00*    (2011.01)
*G06K 9/20*    (2006.01)
(Continued)

(52) U.S. Cl.
CPC ............. *G06K 9/209* (2013.01); *G06F 21/32* (2013.01); *G06K 9/00248* (2013.01);
(Continued)

(58) Field of Classification Search
CPC ............... G06K 9/209; G06K 9/00892; G06K 9/00604; G06K 9/00248; G06K 9/00255; G06F 21/32; H04N 5/247
See application file for complete search history.

(56) References Cited

U.S. PATENT DOCUMENTS 9,054,875 B2    6/2015    Hama
10,156,900 B2    12/2018    Publicover et al.
(Continued)

FOREIGN PATENT DOCUMENTS

KR    10-2009-0106792 A    10/2009
KR    10-2013-0078064 A    7/2013
(Continued)

OTHER PUBLICATIONS

ISA/KR, International Search Report and Written Opinion of the International Searching Authority, International Application No. PCT/KR2019/002113, dated Jun. 25, 2019, 9 pages.

*Primary Examiner* — Zhihan Zhou

(57) ABSTRACT

Disclosed is an electronic apparatus including a first camera, a second camera, and a processor. The first camera includes a first FOV. The second camera includes a second FOV corresponding to part of the first FOV. The processor is configured to obtain a request associated with biometric authentication. The processor is configured obtain at least one first image using the first camera and at least one second image using the second camera. The processor is configured to identify a first external object that is included in the at least first image while obtaining the first image. While obtaining the at least one second image, the processor is configured to provide notification information for obtaining at least one image including the second external object when the second external object that is at least part of the first external object, is not included in the at least second image.

14 Claims, 21 Drawing Sheets

(51) Int. Cl.
*H04N 5/247* (2006.01)
*G06F 21/32* (2013.01)
*G06K 9/00* (2006.01)

(52) U.S. Cl.
CPC ..... *G06K 9/00255* (2013.01); *G06K 9/00604* (2013.01); *H04N 5/247* (2013.01)

(56) References Cited

U.S. PATENT DOCUMENTS

| | | | | |
|---|---|---|---|---|
| 2005/0089197 | A1* | 4/2005 | Iwasaki | G06K 9/00221 382/115 |
| 2013/0283057 | A1* | 10/2013 | Hama | G06K 9/00885 713/186 |
| 2015/0220157 | A1 | 8/2015 | Marggraff et al. | |
| 2015/0324568 | A1* | 11/2015 | Publicover | G06F 21/64 726/19 |
| 2017/0061210 | A1* | 3/2017 | Ollila | H04N 5/23219 |

FOREIGN PATENT DOCUMENTS

| | | |
|---|---|---|
| KR | 10-2014-0128502 A | 11/2014 |
| KR | 10-2017-0004706 A | 1/2017 |
| KR | 10-2017-0047195 A | 5/2017 |

\* cited by examiner

METHOD OF BIOMETRIC AUTHENTICATING USING PLURALITY OF CAMERA WITH DIFFERENT FIELD OF VIEW AND ELECTRONIC APPARATUS THEREOF

CROSS-REFERENCE TO RELATED APPLICATIONS

This application is based on and claims priority under 35 U.S.C. § 119 to Korean Patent Application No. 10-2018-0022275 filed on Feb. 23, 2018 in the Korean Intellectual Property Office, the disclosure of which is incorporated by reference herein in its entirety.

BACKGROUND

1. Field

The present disclosure relates to an authentication technology using biometric information.

2. Description of Related Art

While the importance of security increases with the increase in the digital devices, various authentication methods such as biometric authentication are used for the security of user information. The biometric authentication is an authentication method that extracts biometric information, which is specified to a person, such as fingerprints, an iris, a sweat gland structure, a face, blood vessels, or the like to use the extracted biometric information.

The biometric authentication is being used for various purposes in electronic apparatuses. For example, the biometric authentication is applied to various fields such as unlocking of a home screen for the use of an electronic apparatus and user authentication upon making an electronic commerce payment.

In recent years, since the importance of information security has increased and the fields of use have been diversified, the complex authentication method that performs authentication by using not only biometric information corresponding to one object but also pieces of biometric information is being applied increasingly.

The electronic apparatus may recognize an object associated with biometric authentication to obtain biometric information. For the purpose of performing biometric authentication, recognition of the object, which is the target of authentication, may be performed before the authentication. Unlike the conventional authentication method using a password, the biometric authentication may be influenced by an external environment (e.g., user movement, or the like) while capturing an object, and thus the research for recognizing the appropriate object is actively underway.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the present disclosure, an electronic apparatus may include a first camera having a first FOV and disposed on one surface of the electronic apparatus, a second camera having a second FOV included within the first FOV and disposed on the one surface, and a processor. The processor may be configured to obtain a request associated with biometric authentication, to obtain at least one first image corresponding to the first FOV by using the first camera, based at least on the request, to obtain at least one second image corresponding to the second FOV by using the second camera, based at least on the request, to identify a first external object associated with the biometric authentication among one or more external objects included in the at least one first image, while obtaining the at least one first image, and to provide notification information for obtaining the at least one second image including the second external object while obtaining the at least one second image, when a second external object, which is at least part of the first external object and which is associated with the biometric authentication, is not included in the at least one second image.

In accordance with another aspect of the present disclosure, an electronic apparatus may include a first camera having a first FOV and disposed on one surface of the electronic apparatus, a second camera having a second FOV different from the first FOV and disposed on the one surface and a processor. The processor may be configured to obtain a request associated with biometric authentication, in response to the request, to obtain a first image by using the first camera and recognize a first external object associated with biometric authentication in the first image, in response to the request, to obtain a second image by using a second camera and try to recognize a second external object associated with the biometric authentication in the second image, and when the recognition of the second external object in the second image fails, to provide notification information associated with the first external object.

In accordance with another aspect of the present disclosure, an electronic apparatus may include a first camera having a first FOV and disposed on one surface of the electronic apparatus, a second camera having a second FOV included within the first FOV and disposed on the one surface, and a processor. The processor may be configured to obtain a request associated with biometric authentication, to obtain at least one first image corresponding to the first FOV by using the first camera, based at least on the request, to obtain at least one second image corresponding to the second FOV by using the second camera, based at least on the request, to identify a first external object associated with the biometric authentication among one or more external objects included in the at least one first image, while obtaining the at least one first image, and while obtaining the at least one second image, when a second external object, which is at least part of the first external object and which is associated with the biometric authentication, is not included in the at least one second image, to provide notification information associated with at least one external object of the first external object or the second external object.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to accompanying drawings. However, those of ordinary skill in the art will recognize that modification, equivalent, and/or alternative on various embodiments described herein can be variously made without departing from the scope and spirit of the present disclosure.

Figure 1:
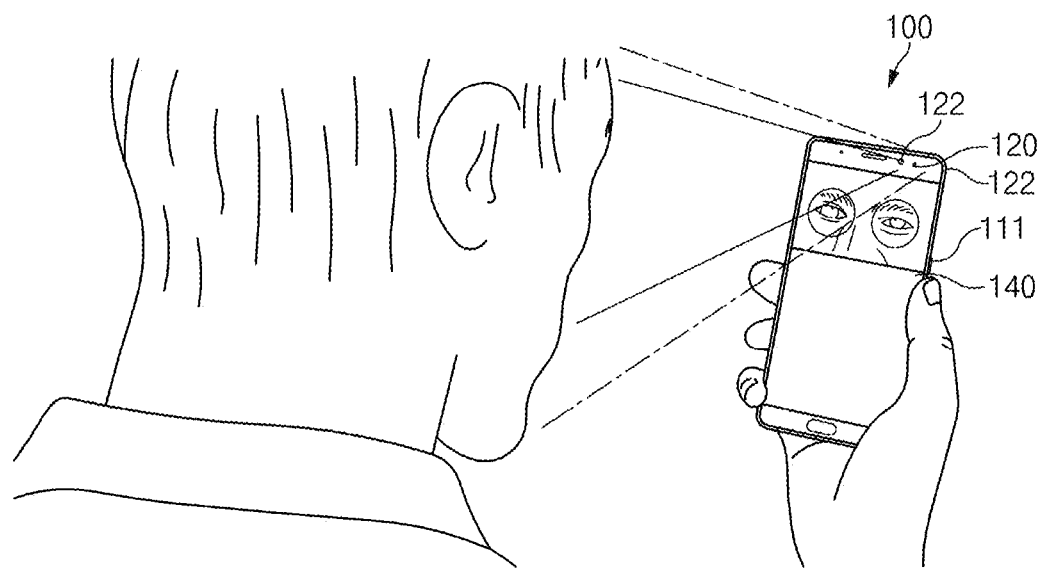
FIG. 1 illustrates an operating environment of an electronic apparatus, according to an embodiment.

FIG. 1 illustrates an operating environment of an electronic apparatus, according to an embodiment.

According to an embodiment, an electronic apparatus 100 may perform biometric authentication. The electronic apparatus 100 may obtain a request associated with biometric authentication, may obtain an image including at least one external object in response to the request, may recognize or obtain an external object associated with the biometric authentication among at least one external object, and may perform the biometric authentication by using biometric information corresponding to the external object. The external object associated with the biometric authentication may be the object predetermined depending on the authentication method. Hereinafter, for convenience of description, the external object associated with the biometric authentication may be referred to as a specified object.

The at least one external object may include, for example, various external objects surrounding the user of the electronic apparatus 100 (or a body part of the user) or the user.

According to an embodiment, the specified object may be set in advance. For example, the specified object may be an iris and/or a face depending on user settings. While the authentication method of the electronic apparatus is set to iris authentication, the specified object may be an iris.

According to an embodiment, the authentication method may be an adaptive authentication method. For example, the adaptive authentication method may be an authentication method that makes it possible to selectively apply the authentication mode depending on the state of the electronic apparatus 100 or the external object.

According to an embodiment, the electronic apparatus 100 may include a plurality of cameras 120 and 122 to obtain an external object.

According to an embodiment, the plurality of cameras 120 and 122 may obtain images corresponding to field of views different each other. The first camera 120 may have a first field of view (hereinafter referred to as "FOV") (or angle of view) and the second camera 122 may have a second FOV. The first FOV may include the second FOV. The first FOV may include a range wider than the second FOV.

According to an embodiment, the plurality of cameras 120 and 122 may be disposed on one surface 111 of the electronic apparatus. A display 140 may be disposed on the one surface 111.

Figure 2:
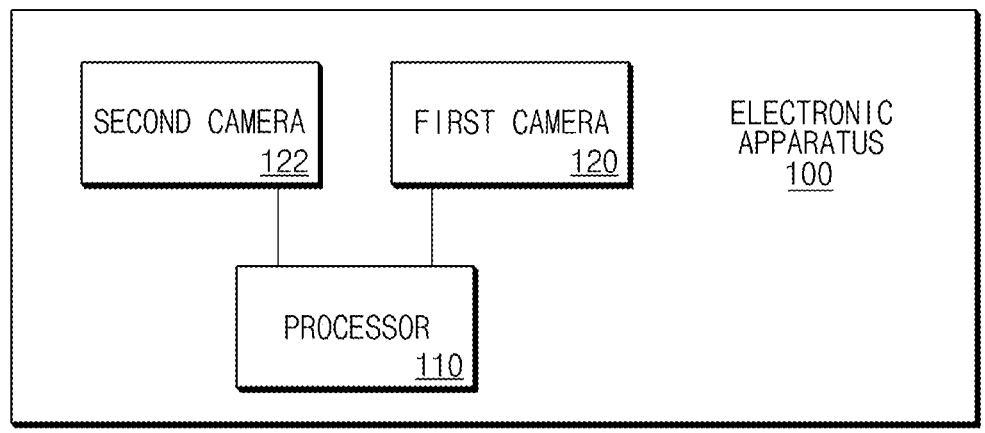
FIG. 2 illustrates a block diagram of a configuration of an electronic apparatus, according to an embodiment.

FIG. 2 illustrates a block diagram a configuration of an electronic apparatus, according to an embodiment.

According to an embodiment, the electronic apparatus 100 (e.g., the electronic apparatus 100 of FIG. 1) may include at least one of a processor 110, the first camera 120, or the second camera 122. In addition, the configuration of the electronic apparatus 100 may be variously changed or modified according to various embodiments of the present disclosure. For example, the electronic apparatus 100 may further include a component such as a memory (e.g., the memory 2132 of FIG. 21), a display (e.g., the display device 2160 of FIG. 21), or a communication device (e.g., the communication module 2190 of FIG. 21).

According to an embodiment, the processor 110 may perform an operation according to various embodiments of the present disclosure or may control the operation of another component. The processor 110 may command an operation of another component or may receive a command from another component. For example, the processor 110 may obtain at least one image through the first camera 120 or the second camera 122 and may process the obtained image. The processor 110 may obtain the specified object from the obtained image. The processor 110 may perform user authentication using the specified object. The user authentication may include biometric authentication. For example, the biometric authentication may be iris authentication or face authentication. According to an embodiment, the processor 110 may allow the first camera 120 or the second camera 122 to capture an external object, to display the obtained image on a display, and/or to store information in a memory or to read out the stored information.

According to an embodiment, the processor 110 may include at least one of an image processing processor, an application processor, or a camera driving device. The operation of the electronic apparatus according to the embodiments disclosed below may be performed by at least one processor.

According to an embodiment, the first camera 120 may capture an external object of the electronic apparatus 100. The processor 110 may allow the first camera 120 to capture the external object. The processor 110 may obtain a first image corresponding to a first FOV through the first camera 120 and including at least one external object. The first camera 120 may be disposed on the front surface or the rear surface of the electronic apparatus 100. The first camera 120 may be exposed through the front housing or the rear housing of the electronic apparatus 100.

According to an embodiment, the second camera 122 may capture an external object of the electronic apparatus 100. The processor 110 may allow the second camera 122 to capture the external object. The processor 110 may obtain a second image corresponding to a second FOV through the second camera 122 and including at least one external object. The second camera 122 may be disposed on the front surface or the rear surface of the electronic apparatus 100. The second camera 122 may be exposed through the front housing or the rear housing of the electronic apparatus 100.

According to an embodiment, the first camera 120 may be a device configured to obtain an image using visible light. The first camera 120 may include an image sensor such as a complementary metal oxide semiconductor (CMOS) or charge-couple device sensor (CCD). In the following description, the first image may mean an image obtained through the first camera 120. The first image is a raw image and may include information about the intensity of light sensed by the imaging medium. The first image may be a full resolution image sensed by the first camera 120.

According to an embodiment, the second camera 122 may be a device configured to obtain an image using an infrared ray (IR). The second camera 122 may include at least one of an IR image sensor or a band pass filter. The IR image sensor may sense the image being captured and may convert the image into an electrical signal. The second camera 122 may obtain an image corresponding to the biometric authentication based on the IR image sensor. In the following description, the second image may mean an image obtained through the second camera 122. The image is a raw image and may have information about the intensity of light sensed by the imaging medium. The image may be a full resolution image sensed by the IR image sensor. In various embodiments, the second camera 122 may be referred to as an "IR camera", and the image captured by the second camera 122 may be referred to as an "IR image".

According to various embodiments of the present disclosure, the electronic apparatus 100 may include a memory (not illustrated). The memory may store various pieces of information described in the present disclosure. For example, the memory may store settings associated with the authentication of the electronic apparatus 100. For example, the electronic apparatus 100 may be configured to perform iris authentication and/or face authentication in response to a request associated with the authentication.

According to an embodiment, the memory may store images obtained through the first camera 120 and/or the second camera 122. The image may be stored in the form of an image file or a video file. The memory may store information associated with the authentication. For example, the memory may digitalize and/or encrypt the biometric information biometric information associated with a user of the electronic apparatus 100 to store the encrypted biometric information in advance. The stored biometric information may be referred to as "biometric data" for performing user authentication. The memory may store biometric feature information authenticated for biometric recognition. The biometric data or biometric feature information may be stored in the secure area of the memory. The memory may be the memory included in a secure element. For example, the secure element may include a secure digital (SD) card.

According to an embodiment, the memory may store instructions that direct the various operations described herein. The processor 110 may execute the instructions.

According to various embodiments, the display (not illustrated) of the electronic apparatus 100 may display various pieces of information (e.g., multimedia data or text data) to a user. The display may display a screen according to the control of the processor 110. The display may be a touchscreen display for obtaining a user input. According to an embodiment, the processor 110 may display a screen including a preview image on the display, or a screen including a graphic image.

Figure 3:
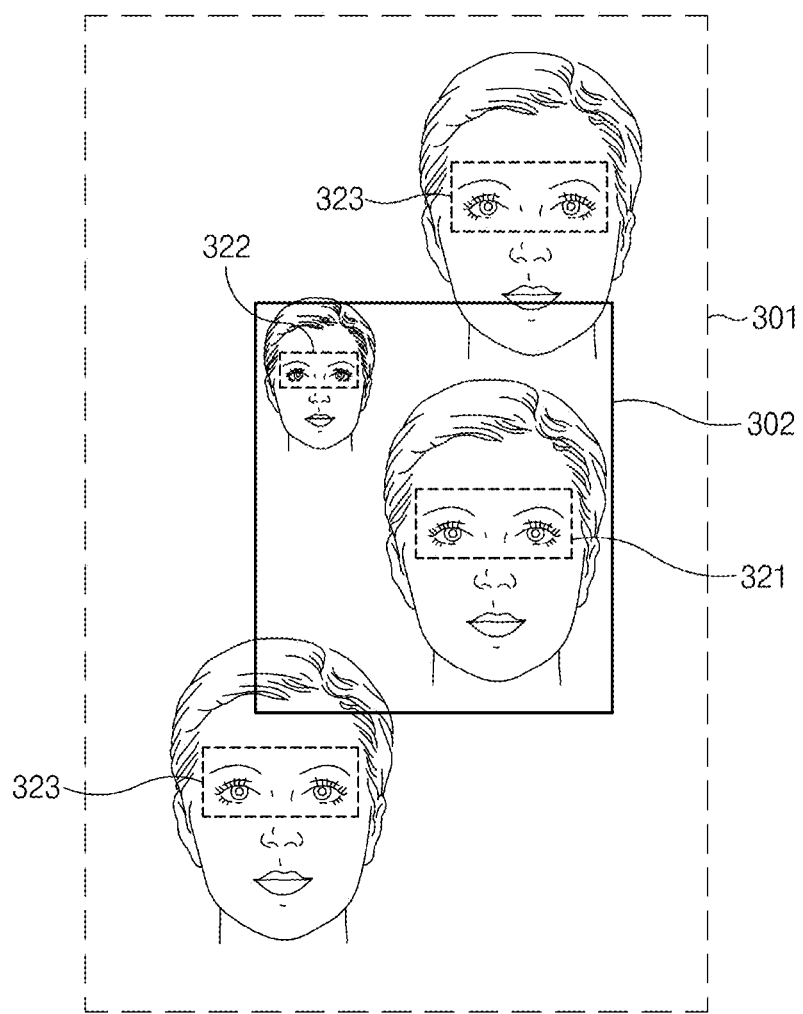
FIG. 3 illustrates a view for conceptually describing an operation in which an electronic apparatus recognizes a specified object by using a plurality of cameras, according to an embodiment.

FIG. 3 illustrates a view for conceptually describing an operation in which an electronic apparatus recognizes a specified object by using two or more cameras, according to an embodiment.

Referring to FIG. 3, an electronic apparatus (e.g., the electronic apparatus 100 of FIG. 1) may primarily identify specified objects 321, 322, and 323 within a first image 301 obtained through a first camera (e.g., the first camera 120 of FIG. 2) and may secondarily identify specified objects 321, 322, and 323 within a second image 302. According to an embodiment, at least one first external object in the first FOV of the first camera may be included in the first image 301, and at least one second external object in the second FOV of the second camera may be included in the second image 302. It is understood that the first image 301 corresponds to the first FOV. It is understood that the second image 302 corresponds to the second FOV.

According to an embodiment, the electronic apparatus 100 may obtain the at least one first image 301 through the first camera and may obtain the at least one second image 302 through the second camera.

According to an embodiment, when the electronic apparatus recognizes the specified objects 321, 322, and 323 in the first image 301, the electronic apparatus may identify whether the specified objects 321, 322, and 323 are present in the second image 302.

For example, when the electronic apparatus succeeds in recognizing the specified object 323 from the first image 301, the electronic apparatus may identify whether the specified object 323 is present in the second image 302 or may try to recognize the specified object 323. Referring to FIG. 3, since the specified object 323 is not positioned in the second image 302, the electronic apparatus may fail to recognize the specified object 323.

For example, when the electronic apparatus succeeds in recognizing the specified object 322 from the first image 301, the electronic apparatus may identify whether the specified object 322 is present in the second image 302 or may try to recognize the specified object 322. Referring to FIG. 3, since the specified object 322 is included in the second image 302, the electronic apparatus may successfully recognize the specified object 322.

According to an embodiment, the electronic apparatus may identify whether the specified objects 321, 322, and 323 obtained using the first image 301 and the second image 302 are appropriate. When the specified objects 321, 322, and 323 satisfy the conditions for biometric authentication, the electronic apparatus may determine that the specified objects 321, 322, and 323 are appropriate. For example, the electronic apparatus may identify whether the specified objects 321, 322, and 323 are appropriate, based on the distance between the specified objects 321, 322, and 323 and the electronic apparatus and/or the locations of the specified objects 321, 322, and 323. For example, when the distance from the electronic apparatus to each of the specified objects 321, 322, and 323 is too far or too close, the electronic apparatus may determine that the specified objects 321, 322, and 323 are not appropriate. For example, when the distance to each of the specified objects 321, 322, and 323 is greater than the specified first distance or is less than the specified second distance, the electronic apparatus may determine that the specified objects 321, 322, and 323 are not appropriate. Referring to FIG. 3, the electronic apparatus may determine that the specified object 322 is not appropriate.

Figure 4:
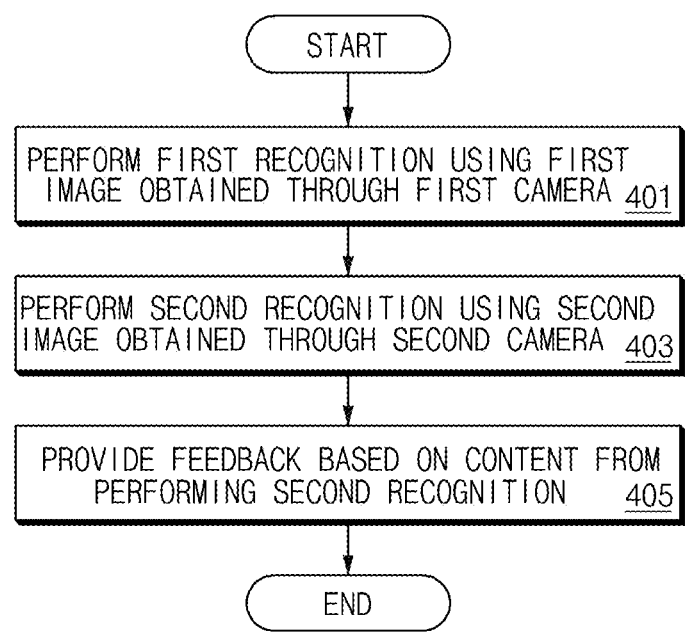
FIG. 4 illustrates a flowchart of an operation in which an electronic apparatus recognizes a specified object by using a plurality of cameras, according to an embodiment.

FIG. 4 illustrates a flowchart of an operation in which an electronic apparatus recognizes a specified object by using two or more cameras, according to an embodiment.

Referring to FIG. 4, an electronic apparatus (e.g., the electronic apparatus 100 of FIG. 1) may perform first recognition using the first image 301 and may perform second recognition using the second image 302. The electronic apparatus may provide a feedback to a user based on at least the result of performing the second recognition. The operation of the electronic apparatus described below may be performed by a processor (e.g., the processor 110 of FIG. 2) of the electronic apparatus. The following operations may be stored in the memory of the electronic apparatus in the form of instructions.

In operation 401, the electronic apparatus may perform first recognition, using the first image obtained through the first camera. The electronic apparatus may obtain a first image corresponding to the first FOV through the first camera. The first image may include at least one first external object. The electronic apparatus may perform the first recognition operation using the first image. The electronic apparatus may identify whether the first image includes the specified object.

In operation 403, the electronic apparatus may perform second recognition, using the second image obtained through the second camera. The electronic apparatus may obtain the second image corresponding to the second FOV through the second camera. The second image may include at least one second external object. The electronic apparatus may perform the second recognition operation using the second image. The electronic apparatus may try to recognize the specified object in the second image.

In operation 405, the electronic apparatus may provide a feedback based on at least content from performing the second recognition. According to an embodiment, the electronic apparatus may provide a feedback based on the first recognition content and the second recognition content.

Figure 5:
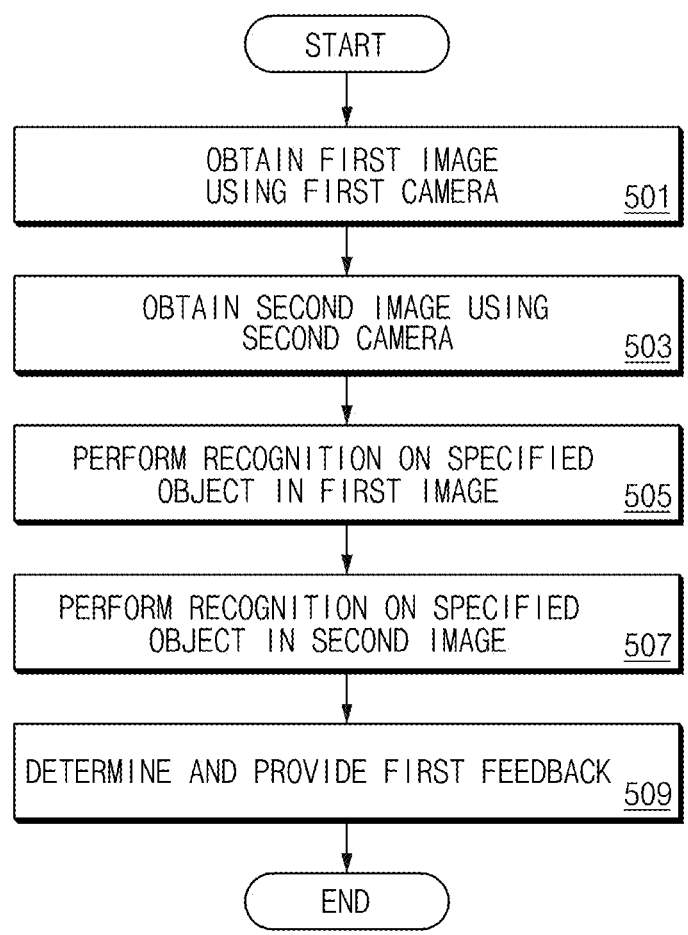
FIG. 5 illustrates an operational flowchart of an electronic apparatus providing a first feedback, according to an embodiment.

FIG. 5 illustrates an operational flowchart of an electronic apparatus providing a first feedback, according to an embodiment.

Referring to FIG. 5, an electronic apparatus may recognize the specified object in a first image; when the electronic apparatus fails to recognize the specified object in the second image, the electronic apparatus may provide a user with the first feedback. The first feedback may include notification information that allows an electronic apparatus to obtain at least one second image including the specified object. The notification information may include information associated with a location. The notification information may be associated with an external object. For example, the notification information may be associated with the external object obtained in the first image.

The operation of the electronic apparatus described below may be performed by a processor (e.g., the processor 110 of FIG. 2) of the electronic apparatus (e.g., the electronic apparatus 100 of FIG. 1). The following operations may be stored in the memory of the electronic apparatus in the form of instructions.

In operation 501, the electronic apparatus may obtain the first image using the first camera. The first image may include at least one first external object. The at least one first external object may be positioned in the first FOV of the first camera. The specified object may be included in at least part of at least one first external object.

In operation 503, the electronic apparatus may obtain the second image by using the second camera. The second image may include at least one second external object. The second external object may be positioned in the second FOV of the second camera. According to the embodiment provided in FIG. 5, the at least one second external object may not include the specified object.

In operation 505, the electronic apparatus may perform recognition on the specified object in the first image. When the electronic apparatus continuously obtains at least one first image, the electronic apparatus may identify the specified object while obtaining the first image. Since it is assumed that the specified object is included in the first image in operation 501, the electronic apparatus may recognize or detect the specified object in the first image.

In operation 507, the electronic apparatus may perform recognition on the specified object in the second image. When the electronic apparatus continuously obtains at least one second image, the electronic apparatus may identify the specified object while obtaining the second image. Since it is assumed that the specified object is not included in the second image in operation 503, the electronic apparatus may fail to recognize (or detect) the specified object in the second image. In terms of electronic apparatus, it may be understood that the specified object is not included in the second image when the specified object is in the FOV of the second camera but the electronic apparatus does not recognize the specified object in the second image. According to various embodiments, the specified object in operation 507 may be different from the specified object in operation 505. For example, in operation 507, the specified object may be a part of the specified object according to operation 505.

In operation 509, the electronic apparatus may determine the first feedback and may provide the first feedback. The electronic apparatus may determine the first feedback based on the distance to the specified object and/or location of the specified object, in response to an operation of identifying the specified object in the second image. The electronic apparatus may provide the determined first feedback. The electronic apparatus may provide the first feedback to a user through various methods. For example, the electronic apparatus may display the first feedback via a display, or may provide the first feedback to the user via voice and/or vibration. The first feedback may include notification information that allows the electronic apparatus to obtain at least one second image including the specified object. Even though the specified object is not included in the second image, the notification information may be provided to the user by identifying the specified object through the first camera.

According to an embodiment, the notification information may include notification information associated with a location. For example, the electronic apparatus may identify that the external object is not located at the specified location (e.g., within the second FOV range) and may provide the first feedback including notification information associated with the location.

Figure 6:
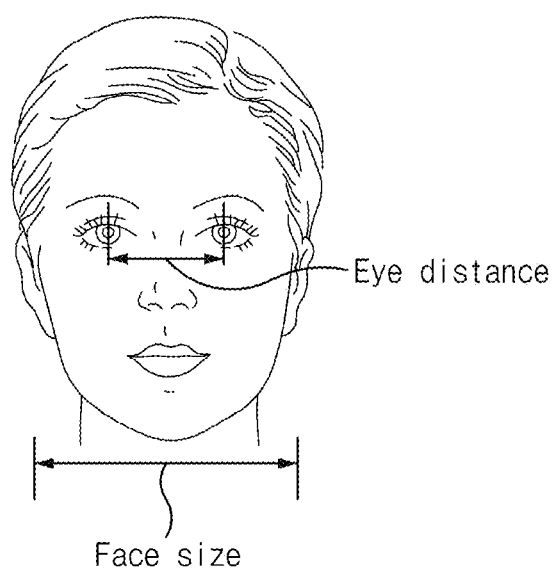
FIG. 6 illustrates a view for conceptually describing a method of providing a first feedback, according to an embodiment.

FIG. 6 illustrates a view for conceptually describing a method of providing a first feedback, according to an embodiment.

Referring to FIG. 6, an electronic apparatus (e.g., the electronic apparatus 100 of FIG. 1) may provide the first feedback to obtain at least one second image including the external object. The first feedback may include notification information associated with a distance and/or a location. The notification information associated with the distance and/or location may be information for notifying a user that the external object is located within the specified distance range from the electronic apparatus.

According to an embodiment, the electronic apparatus may obtain the distance from an external object or a specified object to the electronic apparatus. When the specified object is an iris (or eye), the electronic apparatus may obtain the distance from the external object or specified object to the electronic apparatus based on the eye distance or the detected face size.

According to an embodiment, when the second recognition is not successfully performed even though the specified object is within the first FOV range and second FOV range, the electronic apparatus may provide the first feedback to the user. To this end, the electronic apparatus may provide the user with a first feedback including notification information associated with the distance and/or location based on at least second recognition content. The first feedback may be provided to the user based on the first recognition content and the second recognition content. For example, when the specified object is not appropriate even though the specified object is recognized depending on the second recognition result, the electronic apparatus may provide the first feedback. When the specified object is not appropriate, for example, when the electronic apparatus does not satisfy the condition associated with the distance, the electronic apparatus may determine that the specified object is not appropriate. For example, when the distance between the specified object and the electronic apparatus is out of the specified distance range, the electronic apparatus may determine that the specified object is not appropriate.

Figure 7:
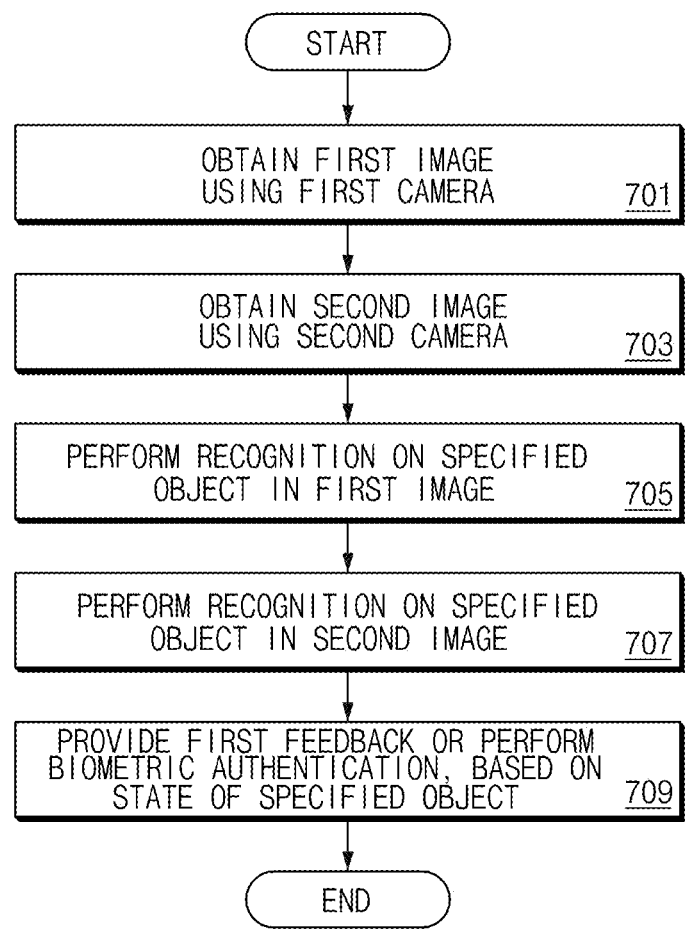
FIG. 7 illustrates an operational flowchart of an electronic apparatus providing a first feedback, according to an embodiment.

FIG. 7 illustrates an operational flowchart of an electronic apparatus providing a first feedback, according to an embodiment.

Referring to FIG. 7, when an electronic apparatus (e.g., the electronic apparatus 100 of FIG. 1) recognizes a specified object in a second image, the electronic apparatus may provide a user with a first feedback including notification information associated with a distance and/or location, if necessary. For example, when the electronic apparatus recognizes the specified object from the second image but the specified object is not appropriate, the electronic apparatus may provide the first feedback to the user. In this case, the first feedback may include notification information associated with the distance. The operation of the electronic apparatus described below may be performed by a processor (e.g., the processor 110 of FIG. 2) of the electronic apparatus. The following operations may be stored in the memory of the electronic apparatus in the form of instructions.

In operation 701, the electronic apparatus may obtain the first image using the first camera. The first image may include at least one first external object. The at least one first external object may be positioned in the first FOV of the first camera. According to the embodiment of FIG. 7, a specified object may be included in at least part of at least one first external object or may not be included in at least part of at least one first external object.

In operation 703, the electronic apparatus may obtain the second image including the specified object by using the second camera. The second image may include at least one second external object. The second external object may be positioned in the second FOV of the second camera.

In operation 705, the electronic apparatus may perform recognition on the specified object in the first image. When the electronic apparatus continuously obtains at least one first image, the electronic apparatus may identify the specified object while obtaining the first image. In operation 705, when the specified object is included in the first image, the electronic apparatus may recognize (or detect) the specified object in the first image; when the specified object is not included in the first image, the electronic apparatus may fail to recognize (or detect) the specified object in the first image.

In operation 707, the electronic apparatus may perform recognition on the specified object in the second image. When the electronic apparatus continuously obtains at least one second image, the electronic apparatus may identify the specified object while obtaining the second image. Since it is assumed that the specified object is included in the second image in operation 703, the electronic apparatus may recognize (or detect) the specified object in the second image. According to various embodiments, the specified object in operation 707 may be different from the specified object in operation 705. For example, in operation 707, the specified object may be a part of the specified object according to operation 705.

In operation 709, the electronic apparatus may provide the first feedback or perform biometric authentication, based on the state of the specified object. The electronic apparatus may determine the state of the specified object, in response to an operation of identifying the specified object in the second image. For example, the electronic apparatus may determine the distance between the specified object and the electronic apparatus.

According to an embodiment, the electronic apparatus may perform the measurement associated with the specified object. The electronic apparatus may identify whether the measurement result satisfies the specified distance range. The electronic apparatus may identify whether the measurement result is too far away (or longer than or equal to a specified first distance) from the specified object or is too close or equal (or closer than a specified second distance) to the specified object.

According to an embodiment, the first feedback may include notification information associated with the distance and/or location of the external object.

According to an embodiment, when the measurement result is farther or nearer than the specified distance range, the electronic apparatus may provide the first feedback.

When the measurement result is within the specified distance range, the electronic apparatus may perform biometric authentication. When the measurement result is between a specified first distance value and a specified second distance value, the electronic apparatus may determine that the specified object is appropriate.

According to an embodiment, when the measurement result is outside the specified location range, the electronic apparatus may provide the first feedback. When the measurement result indicates that the electronic apparatus is within the specified location range, the electronic apparatus may perform biometric authentication.

Figure 8:
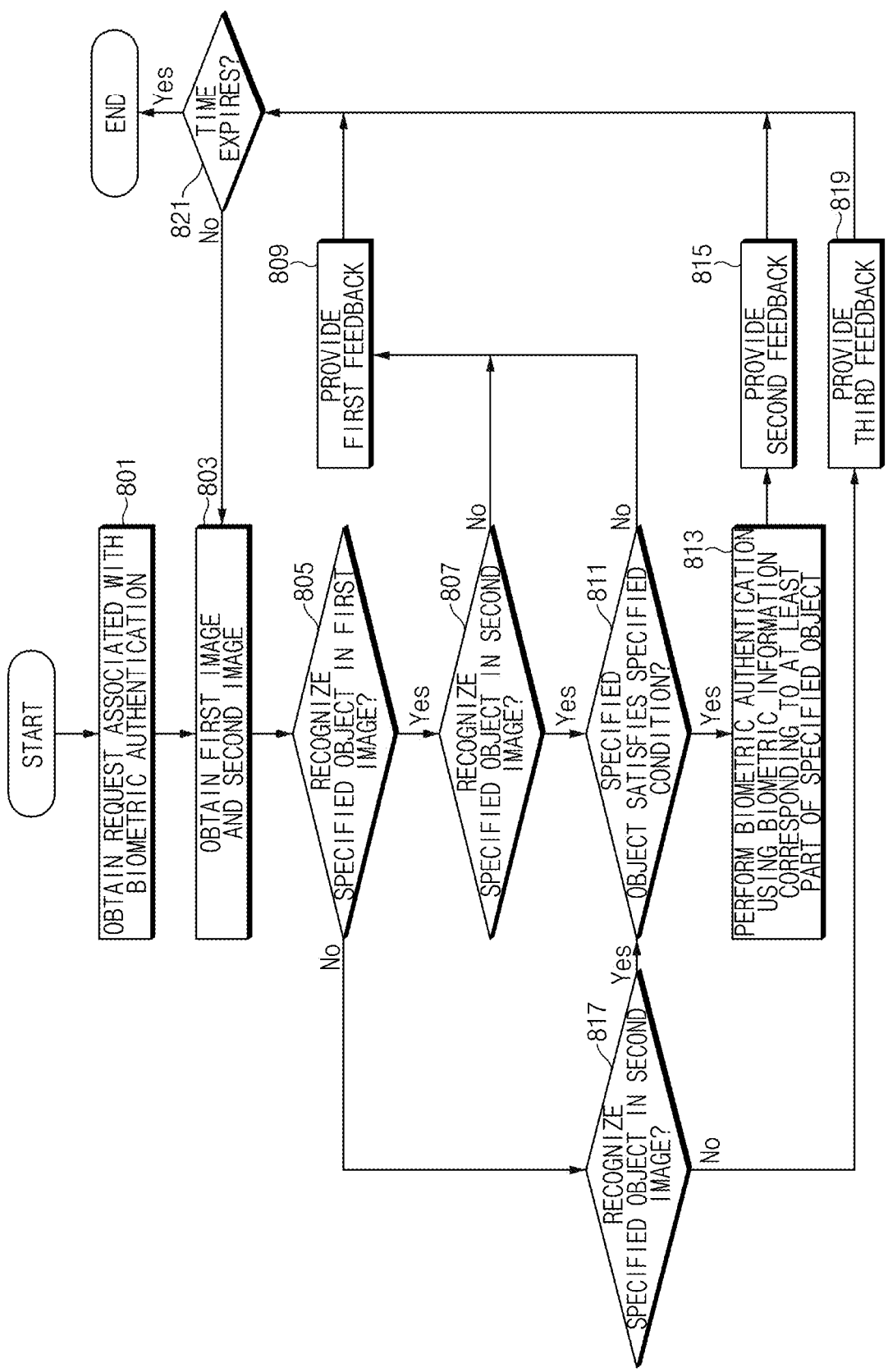
FIG. 8 illustrates a flowchart of an operation in which an electronic apparatus provides various feedbacks, according to an embodiment.

FIG. 8 illustrates a flowchart of an operation in which an electronic apparatus provides various feedbacks, according to an embodiment.

Referring to FIG. 8, an electronic apparatus may provide various feedbacks based on the first recognition result and the second recognition result. The operation of the electronic apparatus described below may be performed by a processor (e.g., the processor 110 of FIG. 2) of the electronic apparatus (e.g., the electronic apparatus 100 of FIG. 1). The following operations may be stored in the memory of the electronic apparatus in the form of instructions.

In operation 801, the electronic apparatus may obtain a request associated with biometric authentication. The request associated with the biometric authentication may correspond to the user's selection, a request associated with authentication from the external device, or an operation associated with authentication of the electronic apparatus or may be generated in response to the corresponding operation.

In operation 803, the electronic apparatus may obtain a first image and a second image. The first image may be an image, which is obtained by the electronic apparatus using the first camera. The second image may be an image, which is obtained by the electronic apparatus using the second camera.

In operation 805, the electronic apparatus may try to recognize a specified object in the first image. The electronic apparatus may identify (or search for) whether the specified object is present in the first image and may try to recognize the specified object in the second image in operation 807 and operation 817.

The electronic apparatus may recognize the specified object from the first image in operation 805; when the electronic apparatus does not recognize the specified object from the second image in operation 807, the electronic apparatus may perform operation 809; when the electronic apparatus recognizes the specified object from the second image in operation 807 and operation 817, the electronic apparatus may perform operation 811. In operation 805 and operation 817, when the electronic apparatus fails to recognize the specified object from the first image but recognizes the specified object from the second image, the electronic apparatus may perform operation 819.

According to an embodiment, the specified object to be recognized within the first image may be different from the specified object to be recognized within the second image. For example, the electronic apparatus may try to recognize the first specified object within the first image and may try to recognize the second specified object within the second image. The second specified object may include at least part of the first specified object. The electronic apparatus may try to recognize a face including an eyeball within the first image and may try to recognize the eyeball within the second image.

In operation 809, the electronic apparatus may provide a first feedback. The electronic apparatus may provide the first feedback including notification information that makes it possible to obtain at least one second image including the specified object, in response to recognition failure of the specified object from the second image. The first feedback may be displayed via the display of the electronic apparatus.

According to an embodiment, the electronic apparatus may determine the first feedback based on the at least second image to provide the first feedback. For example, electronic apparatus may identify whether the specified object satisfies the specified condition, using the first image and the second image. When the specified object does not satisfy the specified condition, the electronic apparatus may provide information associated with the distance and/or location based on the distance and/or location of the specified object.

When the specified object associated with the first image is different, the electronic apparatus may provide information associated with the distance and/or location based on the distance from at least one specified object and/or the location of at least one specified object among the first specified object or the second specified object.

According to an embodiment, the first feedback may include information associated with the distance and/or the location. The electronic apparatus may provide a first feedback that allows the specified object to be located within the second image, such as movement upward/movement downward/movement to the left/movement to the right.

In operation 811, the electronic apparatus may identify whether the specified object satisfies a specified condition. The specified condition may be associated with the distance between the specified object and the electronic apparatus. The specified condition may include whether the distance between the specified object and the electronic apparatus satisfies a specified distance range. For example, when the specified object satisfies the specified condition, the electronic apparatus may perform the operation 813; when the specified object does not satisfy the specified condition, the electronic apparatus may perform operation 809.

When the specified object is different in operation 805 and operation 807, in operation 811, the electronic apparatus may determine whether a specified object (or a specified object to be recognized within a second image) satisfies a specified condition.

In operation 809, the electronic apparatus may provide a first feedback. In this case, the electronic apparatus may provide the first feedback including notification information associated with the distance and/or location, in response to the result of identifying the specified condition.

In operation 813, the electronic apparatus may perform biometric authentication using biometric information corresponding to at least part of the specified object. For example, when the specified object is an eye or a face, the electronic apparatus may perform biometric authentication using biometric information corresponding to an iris. The electronic apparatus may obtain biometric information from the specified object; and the electronic apparatus may perform biometric authentication by comparing the biometric information with biometric data.

In operation 815, the electronic apparatus may provide a second feedback. The second feedback may include the biometric authentication result. For example, when the biometric information does not coincide with the biometric data, the electronic apparatus may provide the second feedback indicating an authentication failure; when the biometric information coincides with the biometric data, the electronic apparatus may provide the second feedback indicating an authentication success. The authentication success may be indirectly recognized by the user, as an operation of disabling security. For example, when authentication is successful, the electronic apparatus may unlock the home screen lock or may unlock the application lock.

In operation 819, the electronic apparatus may provide a third feedback. When it is indicated that the specified object cannot be recognized or when the specified object is not located within the FOV range of each of the first and second cameras of the electronic apparatus, the third feedback may include the notification information that allows the specified object to be located within the FOV range.

After performing operation 809, operation 815, or operation 819, the electronic apparatus may perform operation 821. In operation 821, the electronic apparatus may determine whether the predetermined time has expired. The predetermined time may be the time set for authentication. When the time has not expired, the electronic apparatus may perform operation 803 and then may obtain the next image.

When the time has expired, the electronic apparatus may terminate biometric authentication.

Figure 9:
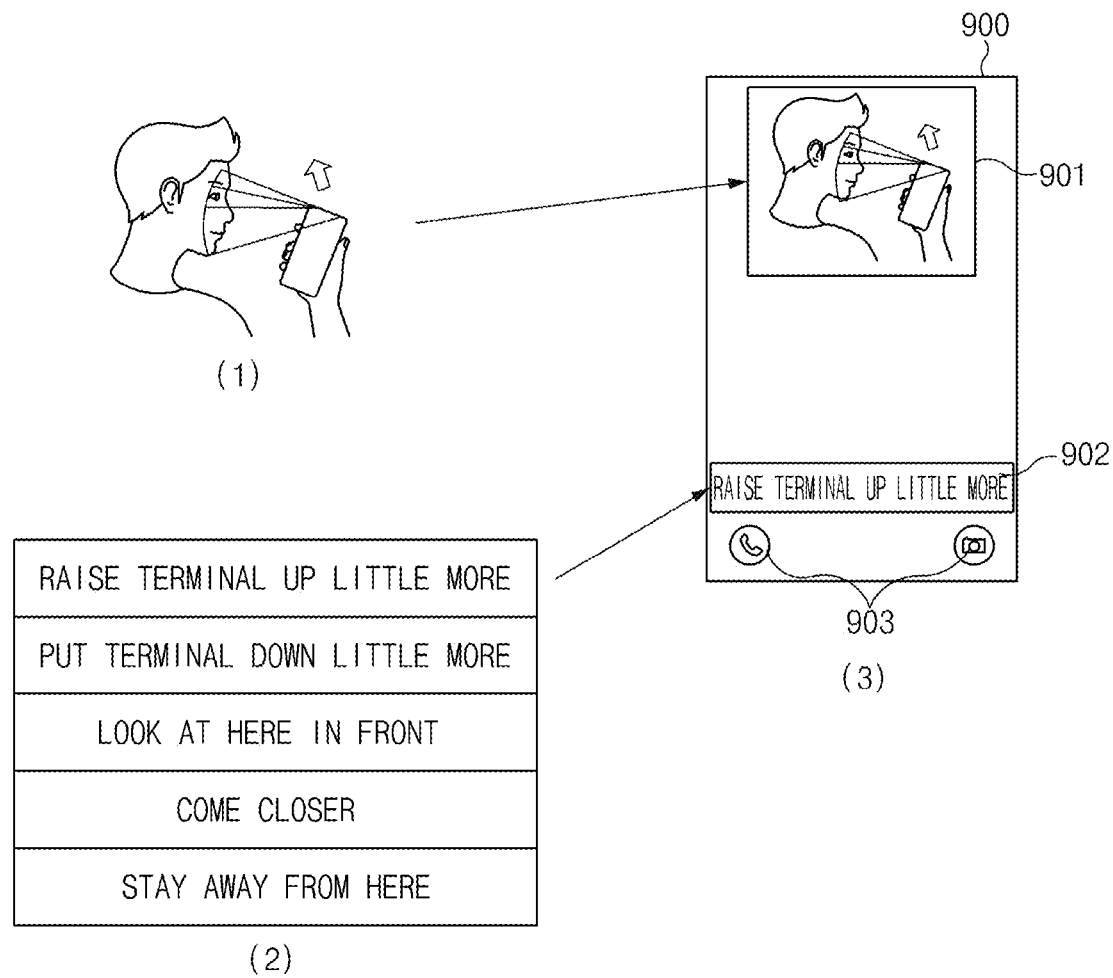
FIG. 9 illustrates a feedback displayed by the electronic apparatus through a display, according to an embodiment.

FIG. 9 illustrates a feedback displayed by the electronic apparatus through a display, according to an embodiment.

(1) and (2) of FIG. 9 illustrates that an electronic apparatus (e.g., the electronic apparatus 100 of FIG. 1) displays a feedback through a display (e.g., the display 140 of FIG. 2), and (3) of FIG. 9 illustrates a screen including the feedback.

Referring to (1) and (2) of FIG. 9, the feedback provided by the electronic apparatus may be provided in an image or text format. The information included in the feedback may be stored in advance in the memory of the electronic apparatus. FIG. 9 illustrates the first feedback including notification information associated with an external object.

Referring to (3) of FIG. 9, the electronic apparatus may display a screen 900, which includes a first feedback 901 of image form and/or a first feedback 902 of text form, on a display. An embodiment is exemplified in FIG. 9 as the screen 900 is a home screen, but the electronic apparatus according to various embodiments may provide the feedback in an application execution screen. According to an embodiment, the screen 900 may display an item 903 for performing various functions in addition to the feedback described in the present disclosure. According to an embodiment, the item 903 may be an item associated with an application capable of being executed without authentication.

Figure 10:
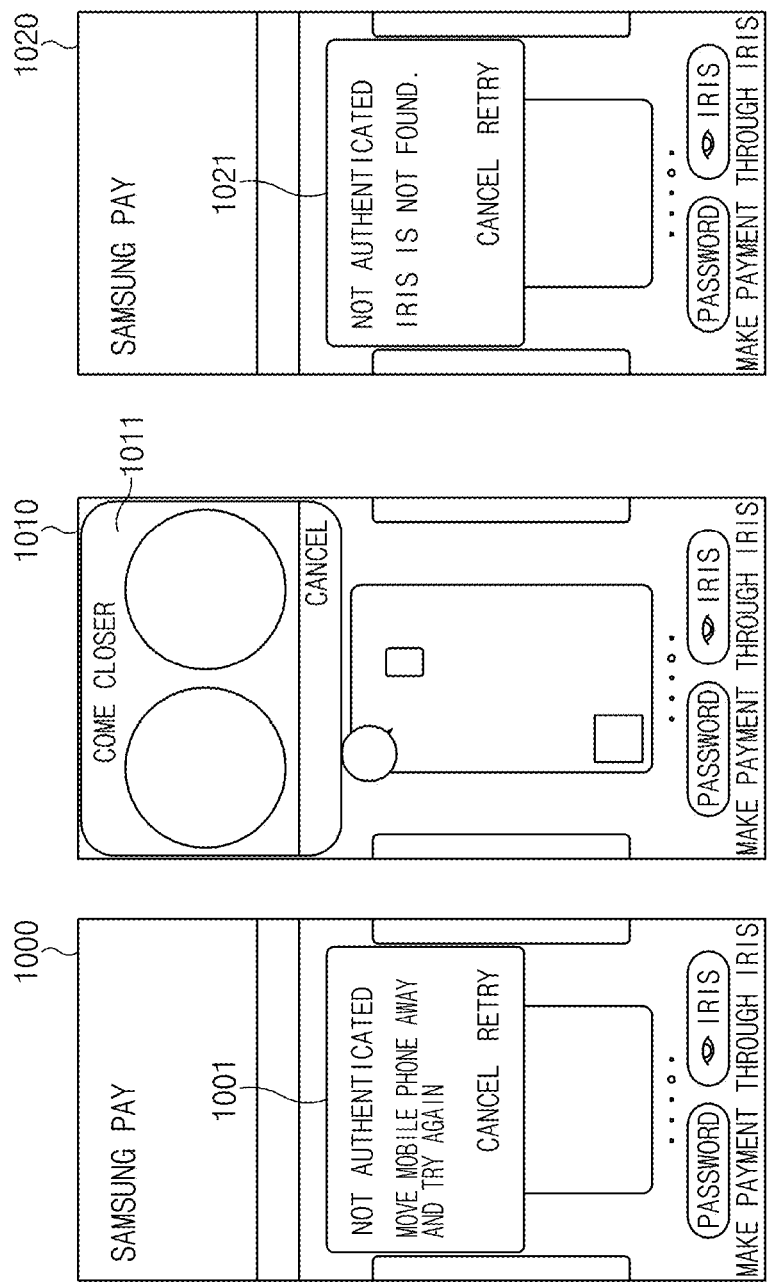
FIG. 10 illustrates a screen including various feedbacks provided by an electronic apparatus, according to an embodiment.

FIG. 10 illustrates a screen including various feedbacks provided by an electronic apparatus, according to an embodiment.

According to an embodiment, a first screen 1000 is illustrated as including a second feedback 1001; a second screen 1010 is illustrated as including a first feedback 1011; and a third screen 1020 is illustrated as including a third feedback 1021. The first feedback 1011 is illustrated as including notification information associated with the position of an external object.

However, an embodiment is exemplified in FIG. 10 as each of the first to third screens 1000 to 1020 is an application execution screen, but the first to third feedbacks 1011, 1001, and 1021 may be displayed on various screens. For example, the first to third feedbacks 1001 to 1021 may be displayed on a home screen.

According to an embodiment, the first to third feedbacks 1011, 1001, and 1021 may be displayed in a pop-up form on the first to third screens 1000 to 1020. According to an embodiment, the first to third feedbacks 1011, 1001, and 1021 may be included in a separate screen displayed on the first to third screens 1000 to 1020, respectively.

According to an embodiment, an electronic apparatus (e.g., the electronic apparatus 100 of FIG. 1) may obtain different specified objects from an image obtained by using a first camera (e.g., the first camera 120 of FIG. 2) and a second camera (e.g., the second camera 122 of FIG. 2) and may perform two or more pieces of biometric authentication by using the specified objects. Various authentication modes for performing two or more pieces of biometric authentication may be defined in the electronic apparatus. According to an embodiment, the electronic apparatus may adaptively select the authentication mode depending on the extent to which security is required.

Figure 11:
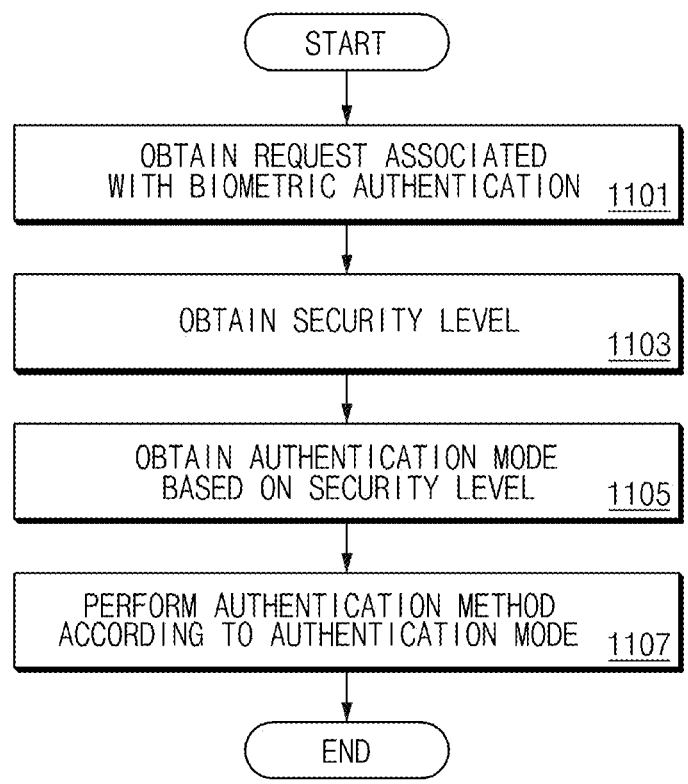
FIG. 11 illustrates a flowchart of an operation in which an electronic apparatus adaptively selects an authentication mode, according to an embodiment.

FIG. 11 illustrates a flowchart of an operation in which an electronic apparatus adaptively selects an authentication mode, according to an embodiment.

Referring to FIG. 11, an electronic apparatus may obtain a security level (or a running operation), may obtain an authentication mode based on the security level (or a running operation), and may perform biometric authentication by using the obtained authentication mode The operation of the electronic apparatus described below may be performed by a processor (e.g., the processor 110 of FIG. 2) of the electronic apparatus (e.g., the electronic apparatus 100 of FIG. 1). The following operations may be stored in the memory of the electronic apparatus in the form of instructions.

In operation 1101, the electronic apparatus may obtain a request associated with biometric authentication. Operation 1101 may refer to the description of operation 801 in FIG. 8.

In operation 1103, the electronic apparatus may obtain the security level. According to an embodiment, the security level may be associated with the running operation or the running application in the electronic apparatus. According to an embodiment, the security level according to the operation being executed may be specified. The information associated with the security level may be stored in the electronic apparatus in advance. For example, the relationship between the security level and the application may be stored in the electronic apparatus. According to an embodiment, when the electronic apparatus is executing an application associated with a payment, the security level may be the first security level; and when the electronic apparatus is executing the home screen, the security level may be the second security level. The second security level may be lower than the first security level.

In operation 1105, the electronic apparatus may obtain the authentication mode based on the security level. The electronic apparatus may obtain the first authentication mode for the first security level and may obtain the second authentication mode for the second security level. Alternatively, when the operation being executed is the first operation, the electronic apparatus may determine the first authentication mode; when the operation being executed is the second operation, the electronic apparatus may determine the second authentication mode. For example, when the electronic apparatus is executing a home screen, the electronic apparatus may determine the first authentication mode; when the electronic apparatus is executing an application associated with a payment, the electronic apparatus may determine the second authentication mode.

In operation 1107, the electronic apparatus may perform an authentication method according to an authentication mode. According to an embodiment, the authentication method may be different depending on the authentication mode. For example, the authentication method of the low security is applied to the first security level requiring relatively low security; a strict authentication method is applied to the second security level requiring relatively high security.

Figure 12:
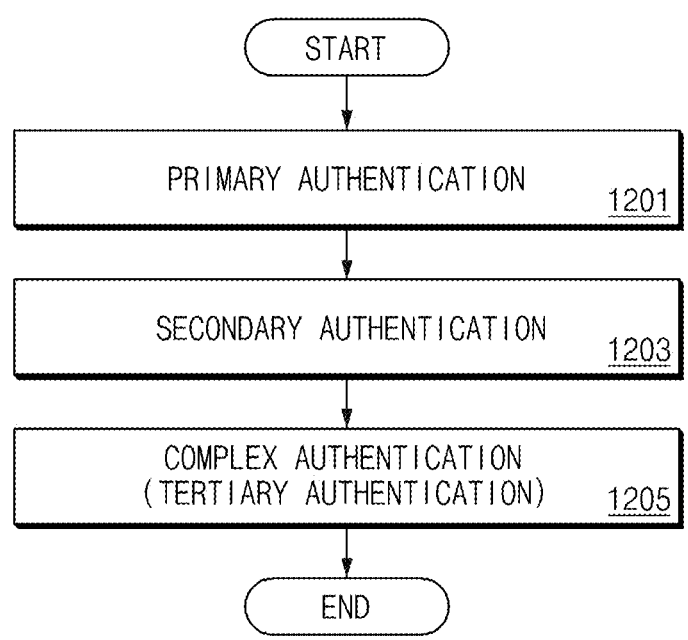
FIG. 12 conceptually illustrates an authentication method executed by an electronic apparatus, according to an embodiment.

FIG. 12 conceptually illustrates an authentication method executed by an electronic apparatus, according to an embodiment.

Referring to FIG. 12, an electronic apparatus may perform two or more pieces of authentication having external objects associated with different biometric authentication methods. The operation of the electronic apparatus described below may be performed by a processor (e.g., the processor 110 of FIG. 2) of the electronic apparatus (e.g., the electronic apparatus 100 of FIG. 1). The following operations may be stored in the memory of the electronic apparatus in the form of instructions.

In operation 1201, the electronic apparatus may perform primary authentication based on the external object associated with the first biometric authentication method. For example, the first biometric authentication method may be iris authentication.

In operation 1203, the electronic apparatus may perform secondary authentication based on the external object associated with the second biometric authentication method. For example, the second biometric authentication method may be face authentication. According to an embodiment, operation 1203 may be performed based on the first authentication result. For example, operation 1203 may be performed when the primary authentication fails.

In operation 1205, the electronic apparatus may perform complex authentication (or tertiary authentication). The electronic apparatus may perform complex authentication based on both the first specified object and the second specified object.

Figure 13:
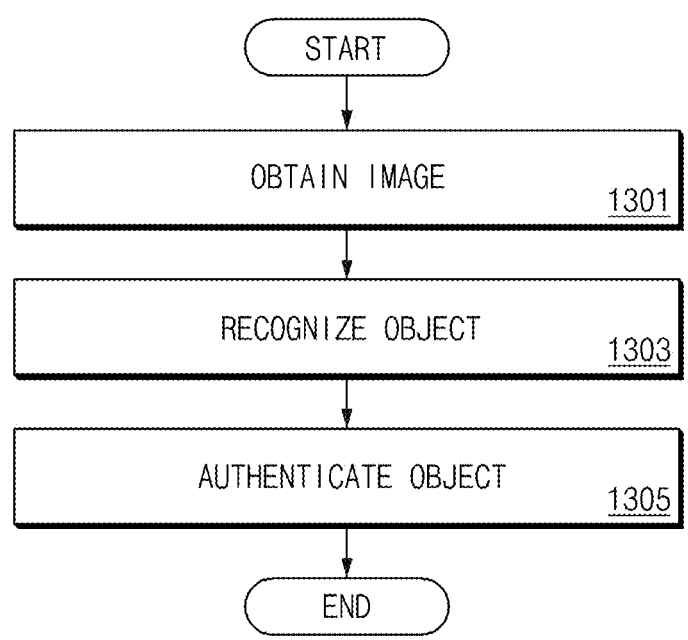
FIG. 13 illustrates a flowchart of an authentication operation of an electronic apparatus, according to an embodiment.

FIG. 13 illustrates a flowchart of an authentication operation of an electronic apparatus, according to an embodiment.

According to an embodiment, the primary authentication or the secondary authentication of FIG. 12 may include an operation of performing object recognition and performing object authentication by using the recognized object. The operation of the electronic apparatus described below may be performed by a processor (e.g., the processor 110 of FIG. 2) of the electronic apparatus (e.g., the electronic apparatus 100 of FIG. 1). The following operations may be stored in the memory of the electronic apparatus in the form of instructions.

In operation 1301, the electronic apparatus may obtain an image. The image may include a first image obtained using a first camera and/or a second image obtained using a second camera.

In operation 1303, the electronic apparatus may perform object recognition. The electronic apparatus may search for a specified object within the obtained image. The specified object may be an iris in the case of iris authentication and a face in the case of face authentication.

In operation 1305, the electronic apparatus may perform object authentication. When the specified object is recognized, the electronic apparatus may obtain biometric information corresponding to the specified object and may perform biometric authentication by using the biometric information.

In the following description, first object recognition and first object authentication may correspond to an authentication method (e.g., face authentication) requiring a relatively low security, and second object recognition and second object authentication may correspond to an authentication method (e.g., iris authentication) requiring a relatively high security. The target of the first object recognition and the first object authentication may be the first specified object, and the target of the second object recognition and the second object authentication may be the second specified object.

According to an embodiment, the electronic apparatus may set an authentication mode depending on the security level and may execute at least one of the first to third pieces of authentication depending on the corresponding authentication mode. Hereinafter, the operation of an electronic apparatus for each authentication mode will be described.

According to an embodiment, the objects of the primary authentication and the secondary authentication may be different depending on the authentication mode. For example, in the first authentication mode requiring relatively low security, the primary authentication may secure the convenience of a user but may use a face authentication method of low security, and the secondary authentication may use the an iris authentication method of high security.

In the second authentication mode requiring relatively high security, the primary authentication may use an iris authentication method, and the secondary authentication may use the face authentication method.

Figure 14:
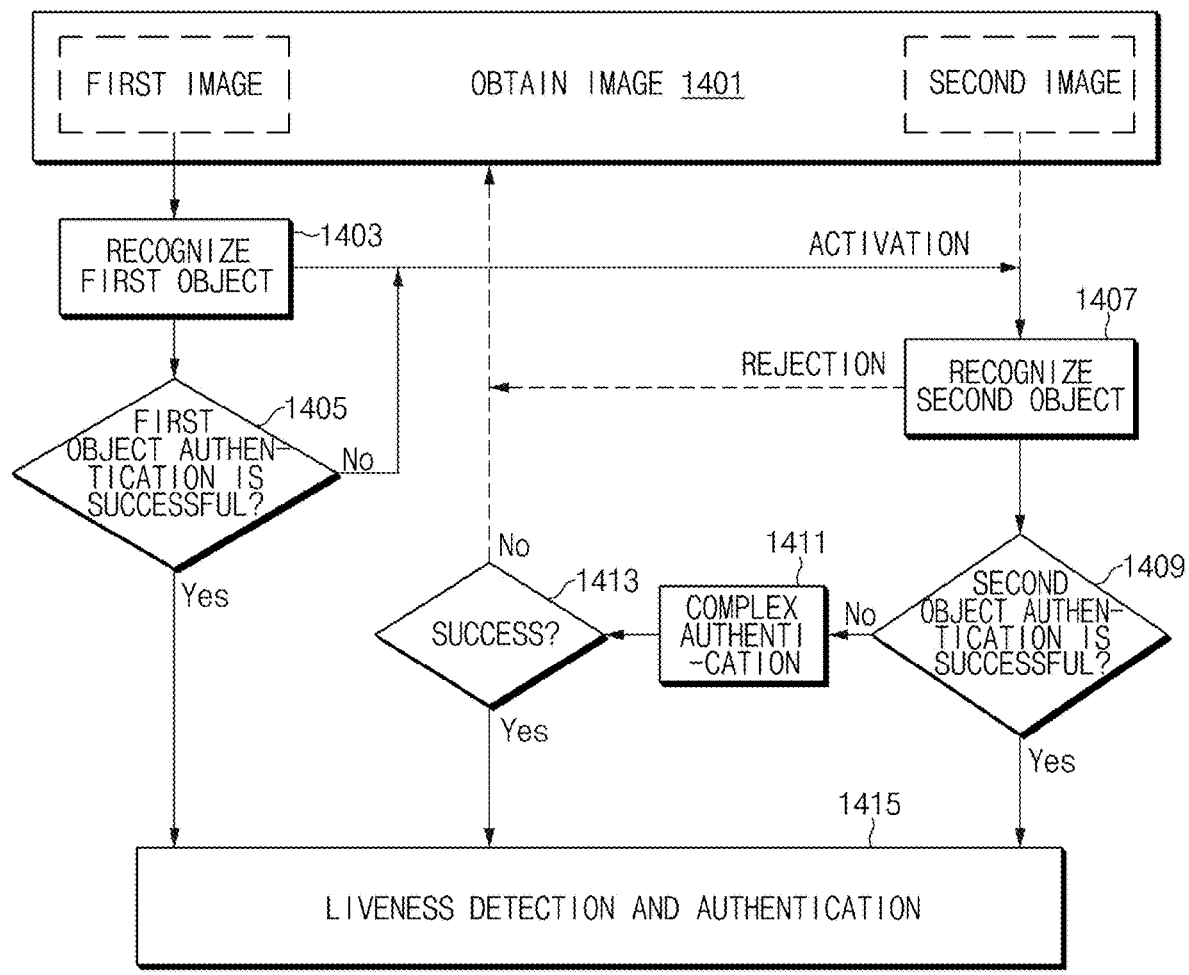
FIG. 14 illustrates an operation of an electronic apparatus in a first authentication mode, according to an embodiment.

FIG. 14 illustrates an operation of an electronic apparatus in a first authentication mode, according to an embodiment.

Referring to FIG. 14, an electronic apparatus may perform primary to tertiary pieces of authentication depending on the first authentication mode. The first authentication mode may be an authentication mode applied when relatively low security is required. The first authentication mode may be an authentication mode applied while a home screen is executed. In the first authentication mode, when the electronic apparatus fails in the primary authentication after performing the primary authentication using a first image obtained by using a first camera (e.g., the first camera 120 of FIG. 2), the electronic apparatus may perform the secondary authentication by using a second image obtained by using a second camera (e.g., the second camera 122 of FIG. 2). The first specified object that is a target of the primary authentication may be a face. The second specified object that is a target of the secondary authentication may be an iris. According to an embodiment, when the secondary authentication fails, the electronic apparatus may perform complex authentication, using the first specified object and the second specified object.

In operation 1401, the electronic apparatus may obtain an image including a first image and a second image. Each of the first image and the second image may include at least one external object. The first image may be an image obtained by using a first camera, and the second image may be an image obtained by using a second camera.

In operation 1403, the electronic apparatus may perform first object recognition, using the first image. The electronic apparatus may search for the first specified object in operation 1403. When the first object recognition fails, the electronic apparatus may activate secondary authentication. When the first object recognition is rejected, the electronic apparatus may determine that the first object recognition fails. When the first object recognition is successful, the electronic apparatus may perform operation 1405.

In operation 1405, the electronic apparatus may perform first object authentication and may identify whether the first object authentication is successful. When the first object authentication fails, the electronic apparatus may activate secondary authentication. When the first object authentication is successful, the electronic apparatus may perform operation 1415.

When the primary authentication fails, the electronic apparatus may activate the secondary authentication. The case where the primary authentication fails may include the case where first object recognition fails or the case where first object authentication fails.

In operation 1407, the electronic apparatus may perform second object recognition. The electronic apparatus may identify whether the second image includes the second specified object. When the second object recognition fails, the electronic apparatus may perform operation 1401. For example, the electronic apparatus may obtain the following image. When the second object recognition is successful, the electronic apparatus may perform operation 1409.

In operation 1409, the electronic apparatus may determine whether the second object authentication is successful. The electronic apparatus may perform the second object authentication in response to the second object recognition. The electronic apparatus may identify whether the second specified object coincides with the previously stored biometric data. When the second object authentication is successful, the electronic apparatus may perform operation 1415; when the second object authentication fails, the electronic apparatus may perform operation 1411.

In operation 1411, the electronic apparatus may perform complex authentication. The electronic apparatus may perform authentication, using the first specified object and the second specified object.

In operation 1413, the electronic apparatus may identify whether the complex authentication is successful. When the complex authentication fails, the electronic apparatus may perform operation 1401; when complex authentication is successful, the electronic apparatus may perform operation 1415.

In operation 1415, the electronic apparatus may perform liveness detection and authentication. The electronic apparatus may perform authentication based on the result of liveness detection.

Figure 15:
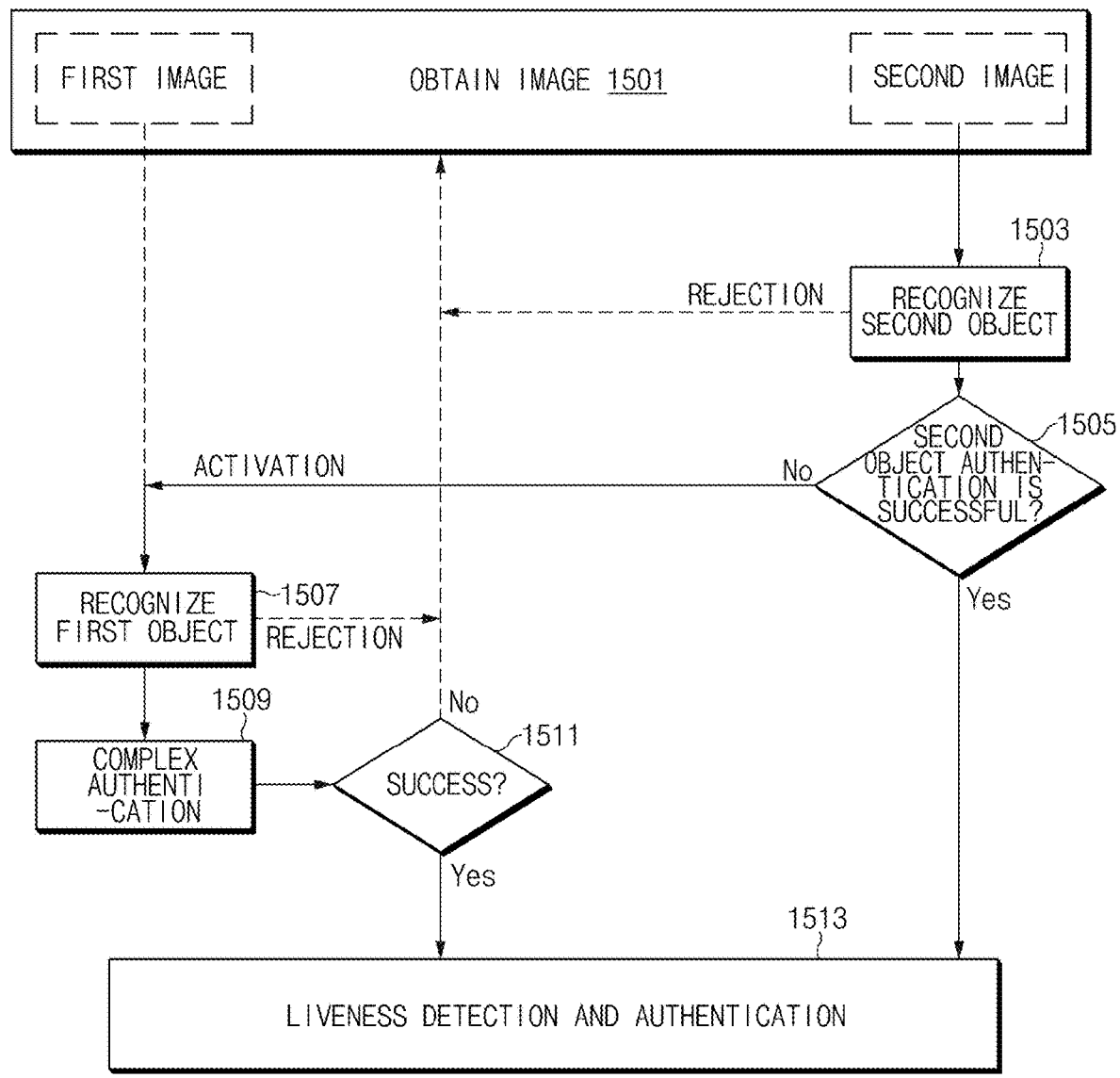
FIG. 15 illustrates a flowchart of an operation of an electronic apparatus in a second authentication mode, according to an embodiment.

FIG. 15 illustrates a flowchart of an operation of an electronic apparatus in a second authentication mode, according to an embodiment.

Referring to FIG. 15, an electronic apparatus may perform primary to tertiary pieces of authentication depending on the second authentication mode. The second authentication mode may be an authentication mode applied when relatively high security is required. In the second authentication mode, when the electronic apparatus fails in the primary authentication after performing the primary authentication using a second image obtained by using a second camera (e.g., the second camera 122 of FIG. 2), the electronic apparatus may perform the secondary authentication by using a first image obtained by using a first camera (e.g., the first camera 120 of FIG. 2). The first specified object that is a target of the primary authentication may be an iris. The second specified object that is a target of the secondary authentication may be a face. According to an embodiment, when the secondary authentication fails, the electronic apparatus may perform complex authentication, using the first specified object and the second specified object.

In operation 1501, the electronic apparatus may obtain an image. The electronic apparatus may obtain a first image and a second image from the image.

In operation 1503, the electronic apparatus may perform second object recognition. Operation 1503 may be the same as or similar to operation 1407 of FIG. 14.

In operation 1505, the electronic apparatus may determine whether the second object authentication is successful. Operation 1505 may be the same as or similar to operation 1409 of FIG. 14. When the second object authentication is successful, the electronic apparatus may perform operation 1513. When the second object authentication fails, the electronic apparatus may activate secondary authentication.

In operation 1507, the electronic apparatus may perform first object recognition. Operation 1507 may be the same as or similar to operation 1403 of FIG. 14. When the electronic apparatus does not recognize the first specified object in the first object recognition operation, the electronic apparatus may obtain operation 1501 and then may obtain the next image. When the electronic apparatus succeeds in recognizing the first specified object, the electronic apparatus may perform operation 1509.

In operation 1509, the electronic apparatus may perform complex authentication. The electronic apparatus may perform authentication, using the first specified object and the second specified object.

In operation 1511, the electronic apparatus may determine whether the complex authentication is successful. When the complex authentication is successful, the electronic apparatus may perform operation 1513. When the complex authentication fails, the electronic apparatus may obtain the next image in operation 1501 and then, may retry authentication.

In operation 1513, the electronic apparatus may perform liveness detection and authentication.

Figure 16:
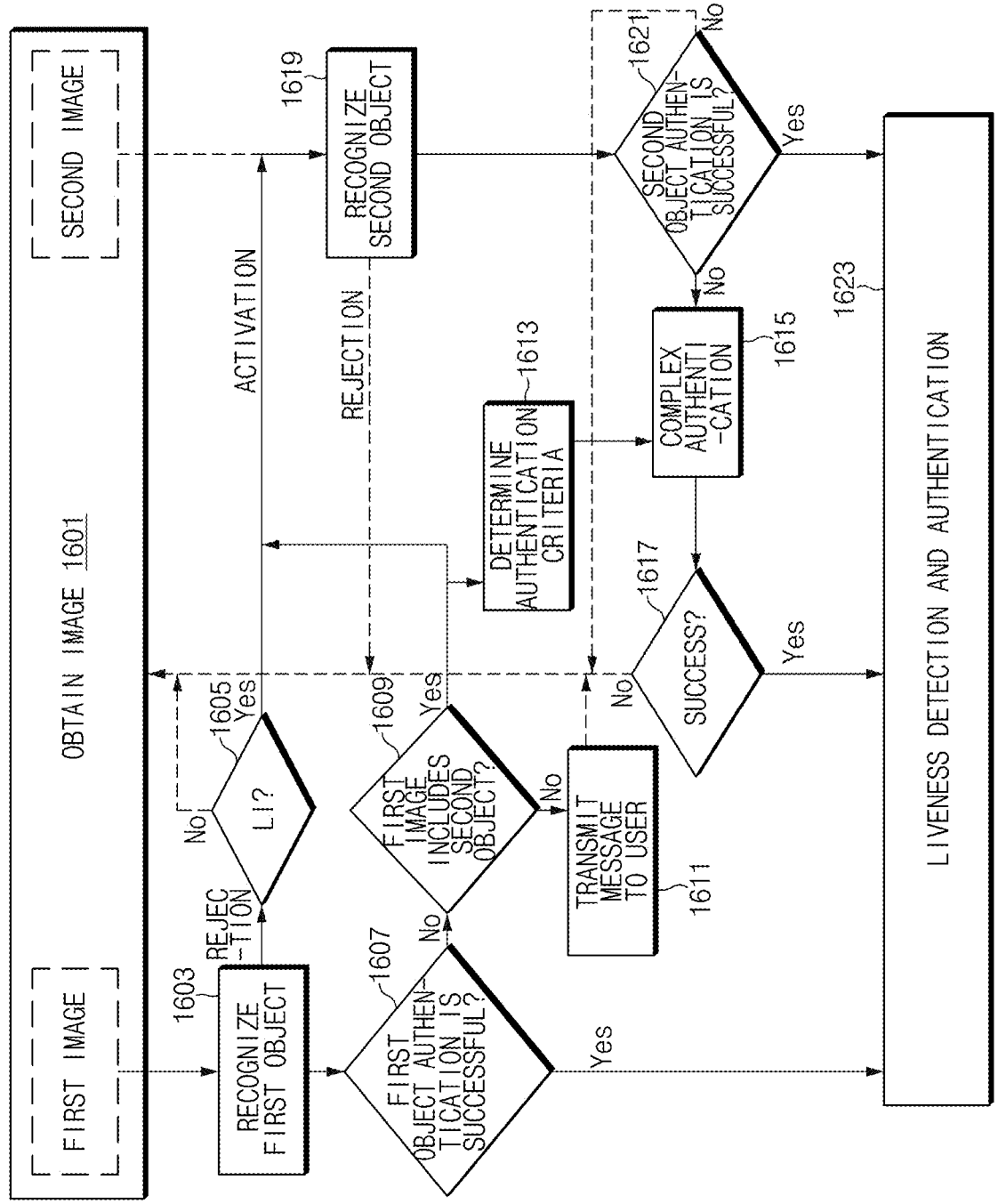
FIG. 16 illustrates a flowchart of an operation of an electronic apparatus in a first authentication mode, according to an embodiment.

FIG. 16 illustrates a flowchart of an operation of an electronic apparatus in a first authentication mode, according to an embodiment.

Referring to FIG. 16, an electronic apparatus may determine the authentication criteria when performing complex authentication. When different authentication criteria are applied depending on a first authentication mode and a second authentication mode upon performing the complex authentication, authentication may be flexibility performed on the first authentication mode requiring a lower security level and the second authentication mode requiring a higher security level.

The operation of the electronic apparatus described below may be performed by a processor of the electronic apparatus. The following operations may be stored in the memory of the electronic apparatus in the form of instructions.

In operation 1601, the electronic apparatus may obtain an image and may preferentially perform primary authentication using a first image. In operation 1603 and operation 1607, the electronic apparatus may perform the primary authentication; when the primary authentication fails, the electronic apparatus may perform operation 1619 and operation 1621. Operation 1603 may be the same as or similar to operation 1403 of FIG. 14; operation 1607 may be the same as or similar to operation 1405 of FIG. 14; operation 1619 may be the same as or similar to operation 1407 of FIG. 14; operation 1621 may be the same as or similar to operation 1409 of FIG. 14. For convenience of description, the detailed description will be omitted.

In operation 1603, when the first object recognition fails, the electronic apparatus may identify the state (or the state of a specified object) of the electronic apparatus. When the state of the electronic apparatus is the specified state, the electronic apparatus may obtain the next image; when the state of the electronic apparatus is not the specified state, the electronic apparatus may activate the secondary authentication and may perform operation 1607. In FIG. 16, for better understanding, the case of determining whether the state of the electronic apparatus is a low illumination (LI) state is illustrated. In the LI state, the electronic apparatus may activate the secondary authentication and may perform operation 1619. When not being in the LI state, the electronic apparatus may perform operation 1601 and may obtain the next image. In the LI state, since it is difficult for the electronic apparatus to perform face recognition, the electronic apparatus may perform secondary authentication as auxiliary authentication.

When the first object authentication is successful in operation 1607, the electronic apparatus may perform operation 1623; when the first object authentication fails, the electronic apparatus may perform operation 1609.

In operation 1609, the electronic apparatus may identify whether the first image includes the second specified object. The electronic apparatus may identify whether the first image includes the object associated with the secondary authentication. When the first image does not include the second specified object, the electronic apparatus may perform operation 1611; when the first image includes the second specified object, the electronic apparatus may activate secondary authentication and may perform operation 1613. In this case, when the external object is likely to be someone other than a user, the electronic apparatus may prevent the secondary authentication from being performed unnecessarily.

In operation 1611, the electronic apparatus may transmit a message to the user. The message may be a message indicating that authentication fails.

In operation 1613, the electronic apparatus may determine the authentication criteria. The authentication criteria may be authentication criteria associated with complex authentication. According to an embodiment, the authentication criteria may be associated with a false accept rate (FAR). The electronic apparatus may determine the FAR associated with the first object recognition (e.g., face recognition) as authentication criteria in the first authentication mode; the electronic apparatus may determine the FAR associated with second object recognition (e.g., iris recognition) as the authentication criteria in the second authentication mode.

In operation 1621, when the second object authentication fails, the electronic apparatus may perform complex authentication in operation 1615; the electronic apparatus may apply the authentication criteria determined in operation 1613. The electronic apparatus may perform complex authentication, using the first specified object and the second specified object. In the first authentication mode, the electronic apparatus may apply the FAR associated with the first object recognition depending on the operation 1613 while performing complex authentication.

In operation 1617, the electronic apparatus may determine whether the complex authentication is successful; when the complex authentication is successful, the electronic apparatus may perform liveness detection and authentication in operation 1623. When complex authentication fails in operation 1617, the electronic apparatus may perform operation 1601 and then may obtain the next image.

According to the embodiment disclosed in FIG. 16, the electronic apparatus may perform face authentication in primary authentication, may determine whether to perform secondary authentication depending on an external environment when applying a relatively low security mode for performing iris authentication in secondary authentication, and may perform user authentication using secondary authentication and/or complex authentication when primary authentication is not successful due to the bad external environment.

For example, when the reliability obtained from face authentication is low because there are few features capable of authenticating a face since a user wears heavy makeup even though the user was himself or herself or since the user grows a beard or wears a hat or mask compared to the biometric data of the electronic apparatus, the electronic apparatus may authenticate the user by using iris authentication.

For example, when the electronic apparatus is in the LI environment, the obtained face image may be too dark or too noisy. In this case, when the reliability of authentication is not enough because there is not enough face features capable of being obtained within the first image, the electronic apparatus may authenticate the user via iris authentication.

As such, efficient authentication may be performed by supplementing the disadvantages of first authentication with second authentication and considering the state of the electronic apparatus.

Figure 17:
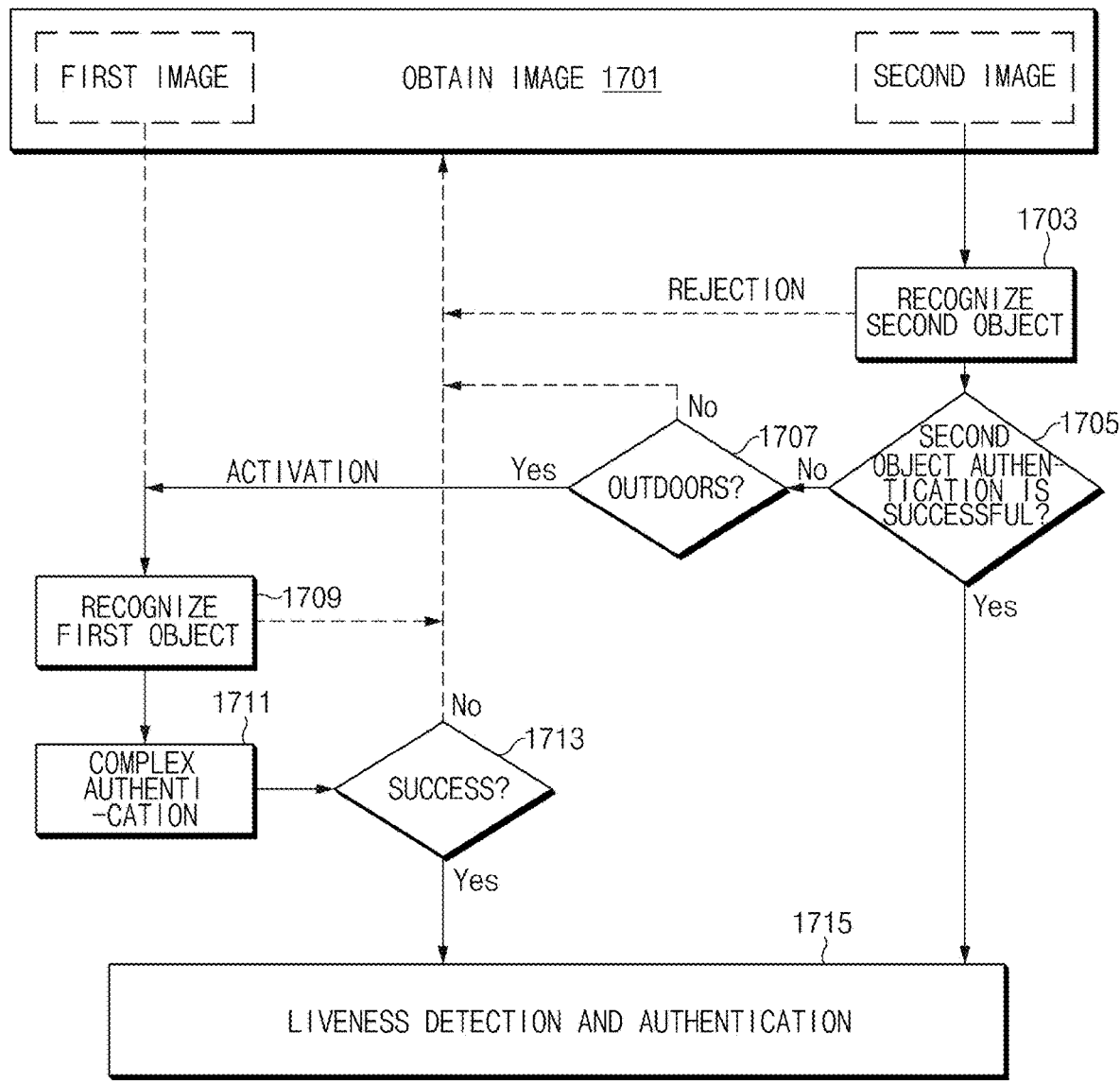
FIG. 17 illustrates a flowchart of an operation of an electronic apparatus in a second authentication mode, according to an embodiment.

FIG. 17 illustrates a flowchart of an operation of an electronic apparatus in a second authentication mode, according to an embodiment.

Referring to FIG. 17, when the primary authentication fails, the electronic apparatus may determine whether to perform the secondary authentication, based on the state (or, situation) of an external object. For example, the electronic apparatus may determine whether to perform the secondary authentication, in consideration of a situation where the user is wearing glasses or is placed outdoors. The operation of the electronic apparatus (e.g., the electronic apparatus 100 of FIG. 1) described below may be performed by a processor (e.g., the processor 110 of FIG. 2) of the electronic apparatus. The following operations may be stored in the memory of the electronic apparatus in the form of instructions.

In operation 1701, the electronic apparatus may obtain an image. In operation 1703 and operation 1705, the electronic apparatus may preferentially perform primary authentication using a second image. When the primary authentication fails, in operation 1707, the electronic apparatus may identify the state of the external object (or the electronic apparatus) and may perform secondary authentication using a first image in operation 1709 based on the state of the external object. Operation 1703 may be the same as or similar to operation 1503 of FIG. 15; operation 1705 may be the same as or similar to operation 1505 of FIG. 15; operation 1709 may be the same as or similar to operation 1507 of FIG. 15. For convenience of description, the detailed description will be omitted.

In operation 1705, when the second object recognition fails, the electronic apparatus may identify the state (or the state of a specified object) of the electronic apparatus. When the electronic apparatus is in the specified state, the electronic apparatus may obtain the next image; when the electronic apparatus is not in the specified state, the electronic apparatus may activate the secondary authentication and may perform operation 1707. An embodiment is exemplified in FIG. 17 as the specified state is an outdoor state, but the embodiments are not limited thereto. For example, the specified state may include a state in which the electronic apparatus cannot accurately recognize a user. For example, when it is difficult to recognize the user because the user is outdoors, or when the probability of recognizing the user as another person increases because the user wears glasses, the electronic apparatus may additionally determine whether the user coincides with the user of the electronic apparatus, through the secondary authentication.

According to an embodiment, the secondary authentication may be a complex authentication using a plurality of specified objects. The electronic apparatus may try to perform first object recognition in operation 1709; when the second object recognition is successful, the electronic apparatus may perform complex authentication using the first specified object and the second specified object in operation 1711.

In operation 1713, the electronic apparatus may determine whether the complex authentication is successful; when the complex authentication is successful, the electronic apparatus may perform liveness detection and authentication in operation 1715. When complex authentication fails in operation 1711, the electronic apparatus may perform operation 1701 and then may obtain the next image.

According to the embodiment disclosed in FIG. 17, the electronic apparatus may perform iris authentication in primary authentication, may determine whether to perform secondary authentication depending on an external environment when applying a relatively high security mode for performing face authentication in secondary authentication, and may perform user authentication using secondary authentication and/or complex authentication when primary authentication is not successful due to the bad external environment. In this case, in the embodiment of FIG. 16 and/or FIG. 17, flexible authentication according to security and user convenience may be performed by determining the authentication criteria of complex authentication depending on the FAR in the primary authentication.

As such, when primary authentication, secondary authentication and/or complex authentication is used, user authentication may be performed more flexibly than single biometric authentication, and efficient user authentication may be performed by reflecting an external environment. The security and user usability may be secured as the authentication means is changed depending on the security level. In addition, the disadvantages of single biometric authentication may be compensated when primary authentication, secondary authentication and/or complex authentication is used. According to various embodiments of the present disclosure, the electronic apparatus may provide the optimized security and convenience for each service. According to various embodiments of the present disclosure, anti-spoofing using heterogeneous sensors may be enhanced.

Figure 18:
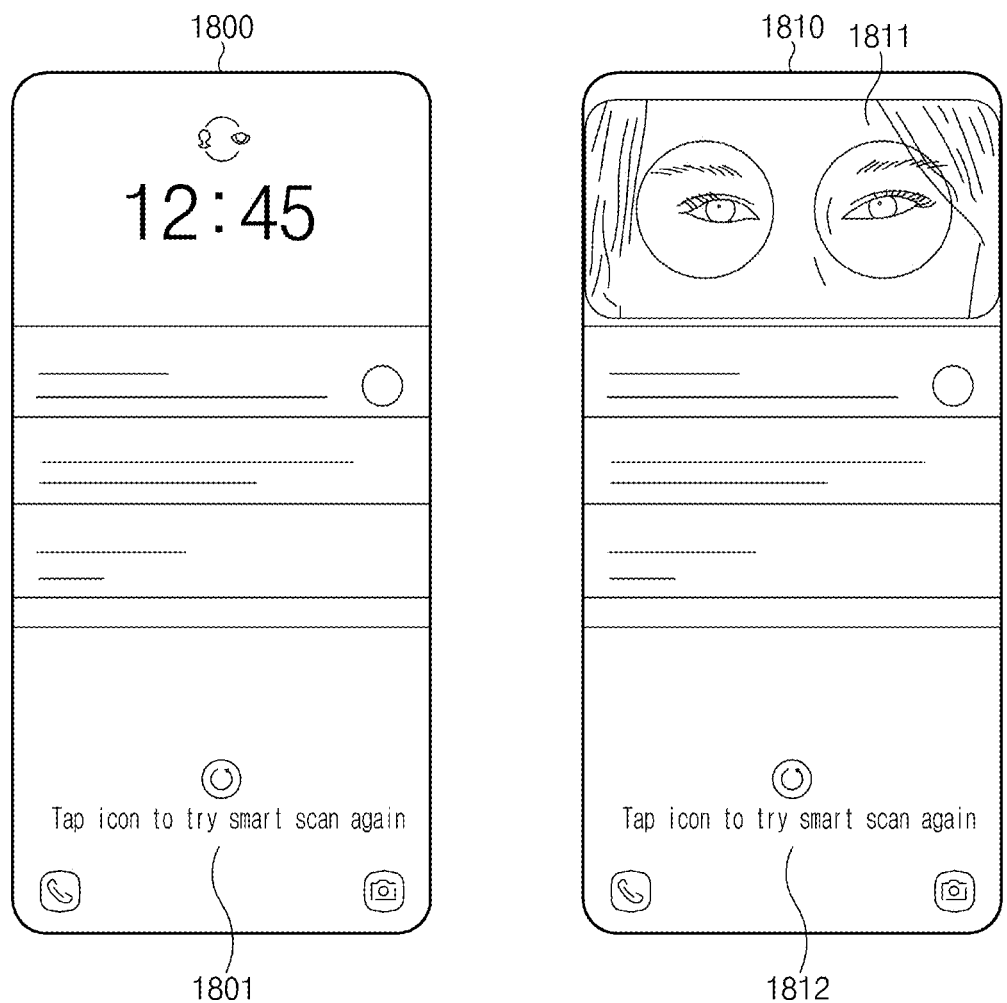
FIG. 18 illustrates an authentication screen of an electronic apparatus, according to an embodiment.

FIG. 18 illustrates an authentication screen of an electronic apparatus, according to an embodiment.

Referring to FIG. 18, an electronic apparatus (e.g., the electronic apparatus 100 of FIG. 1) may provide a first screen 1800 including a graphic image while obtaining an image for authentication or may provide a second screen 1810 including an image 1811 obtained through at least one camera (e.g., the second camera 122 of FIG. 1), via a display.

According to an embodiment, the first screen 1800 and/or the second screen 1810 may provide guides 1801 and 1812 that allow a user to try authentication again.

Figure 19:
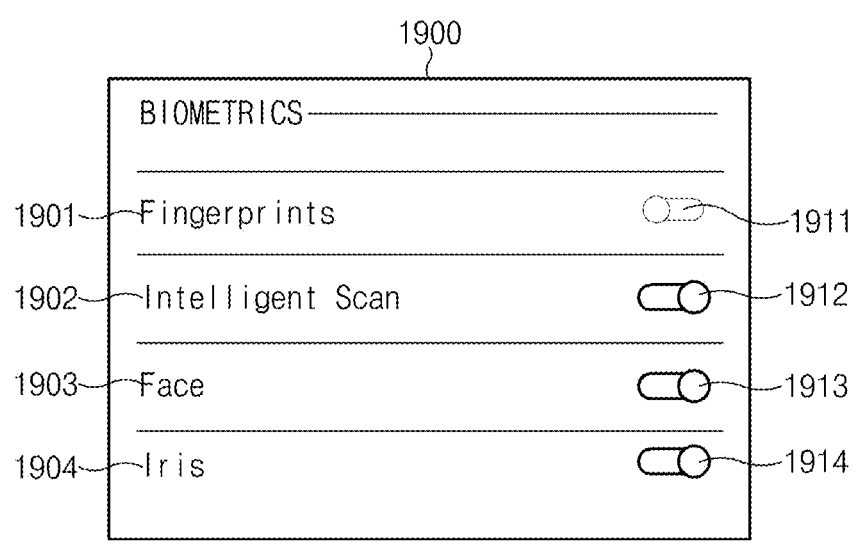
FIG. 19 illustrates an authentication setting screen, according to an embodiment.

FIG. 19 illustrates an authentication setting screen, according to an embodiment.

According to an embodiment, an electronic apparatus (e.g., the electronic apparatus 100 of FIG. 1) may display an authentication setting screen 1900 including at least one icon 1911, 1912, 1913, or 1914 that allows a user to select an authentication method that the user desires.

According to an embodiment, the authentication setting screen 1900 may include icons 1911, 1912, 1913, and 1914 for setting various authentication methods, and icons 1901, 1902, 1903, and 1904 indicating corresponding authentication methods.

According to an embodiment, an embodiment is exemplified in FIG. 19 as the icon 1901 indicating fingerprint recognition (fingerprints), the icon 1902 indicating intelligent scan, the icon 1903 indicating face recognition (face), the icon 1904 indicating iris recognition (iris), and icons 1911, 1912, 1913, and 1914 for respectively selecting the authentication methods, in the authentication setting screen 1900. In addition, various modifications may be possible, such as including icons indicating various authentication methods, including some of the icons, or the like.

Figure 20:
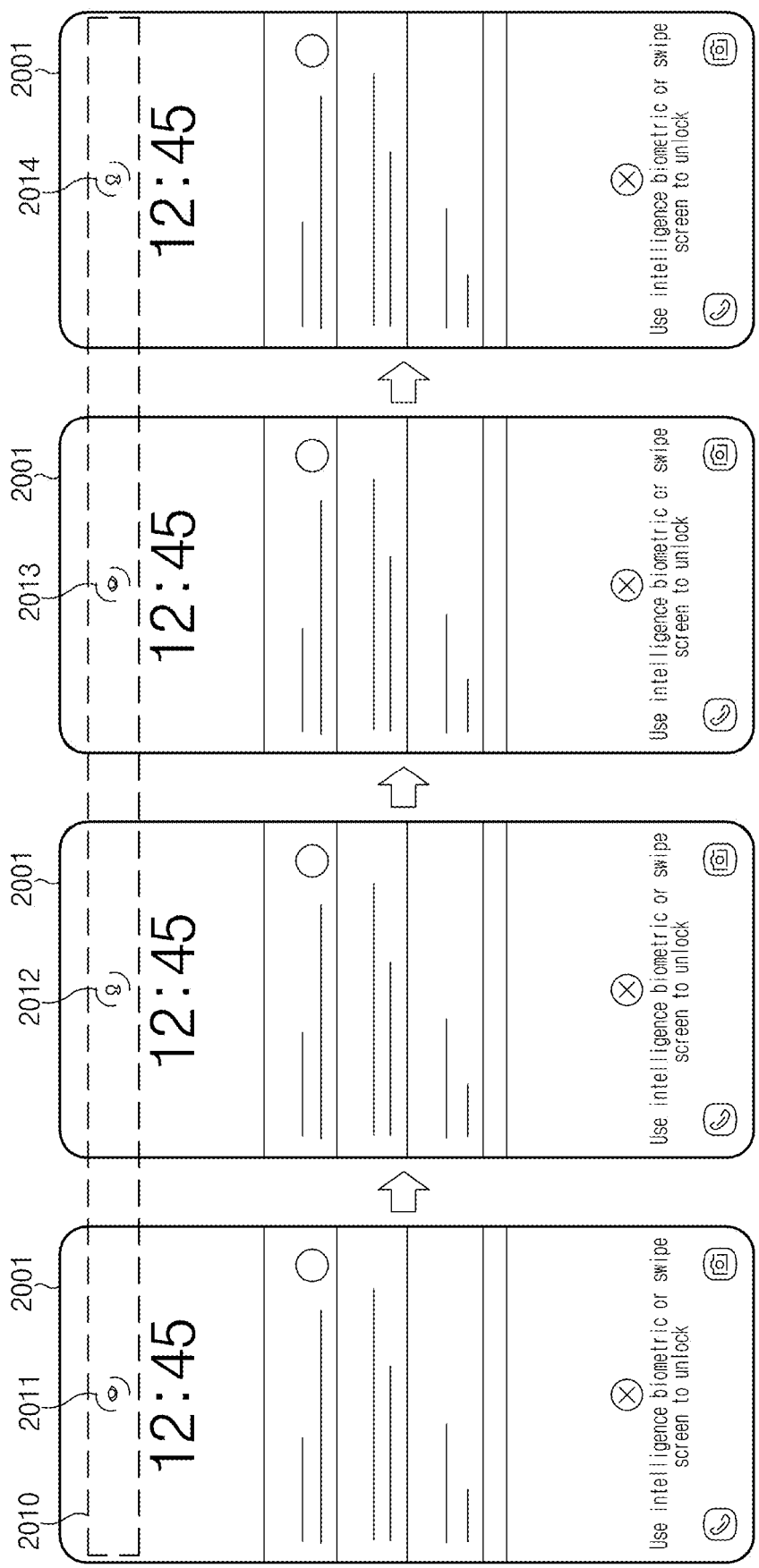
FIG. 20 illustrates a screen for displaying a set authentication method, according to an embodiment.

According to an embodiment, the authentication setting screen 1900 may include icons 1902 and 1912 associated with an intelligent scan method for setting an adaptive authentication method (hereinafter referred to as "intelligent scan") according to the present disclosure. As illustrated in FIG. 20, when the intelligent scan is set, the electronic apparatus may perform authentication according to various embodiments disclosed in the present disclosure, in response to a request associated with the authentication.

According to an embodiment, as illustrated in FIG. 19, even though intelligent scan is not set, the electronic apparatus may perform the adaptive authentication method disclosed in the present disclosure while a plurality of authentication methods are set together. For example, while both the face authentication and the iris authentication are set together through the icon 1913 for setting face authentication and the icon 1914 for setting iris authentication, the electronic apparatus may perform an adaptive authentication method using the face authentication and the iris authentication, in response to a request associated with authentication.

An embodiment is exemplified in FIG. 19 as the icons 1911, 1912, 1913, and 1914 capable of setting the authentication method, which a user desires, in a swipe format. However, the icons 1911, 1912, 1913, and 1914 may be implemented in various methods.

FIG. 20 illustrates a screen for displaying a set authentication method, according to an embodiment.

Referring to FIG. 20, an electronic apparatus (e.g., the electronic apparatus 100 of FIG. 1) may display a screen 2001 including a state display icon 2010 for notifying a user of an authentication method, through a display.

According to an embodiment, the state display icon 2010 may be an icon associated with the authentication method currently being executed.

According to an embodiment, when the electronic apparatus performs secondary authentication after performing primary authentication, the electronic apparatus may display an icon indicating the authentication method associated with a secondary authentication in a screen, after displaying an icon indicating the authentication method associated with the primary authentication.

FIG. 20 illustrates the case where an intelligent scan using iris authentication and face authentication is applied. FIG. 20 illustrates that the authentication method associated with the primary authentication is iris authentication and the authentication method associated with the secondary authentication is face authentication.

While the primary authentication is performed, the electronic apparatus may display an icon 2011 associated with iris authentication on the screen 2001; while the primary authentication fails and the secondary authentication is performed, the electronic apparatus may display an icon 2012 associated with the face authentication on the screen 2001. When obtaining an image again because secondary authentication or complex authentication fails, the electronic apparatus may display an icon 2013 associated with iris authentication again on the screen 2001; when the primary authentication fails, the electronic apparatus may display an icon 2014 associated with the face authentication on the screen 2001. When authentication is completed, the electronic apparatus may disable the security. FIG. 20 illustrates the home screen 2001 of the electronic apparatus. However, the icons may be displayed on an application execution screen.

According to an embodiment, the user may take a location or posture suitable for the authentication method, by identifying the state display icon 2010 and intuitively recognizing the currently executing authentication method.

For example, when it is expected that the quality of the image obtained using a first camera (e.g., the first camera 120 of FIG. 1) is poor in the LI environment, the electronic apparatus may notify the user that the iris authentication is more suitable, by displaying the icon 2012 associated with the iris authentication, and thus may implicitly request the user to take a posture suitable for iris authentication.

According to an embodiment, when it is expected that the quality of an image obtained using a second camera is not good when an external object or an electronic apparatus is located in an outdoor environment, the electronic apparatus may implicitly request the user to take a posture suitable for face authentication by displaying the icon 2013 associated with face authentication on the screen.

According to an embodiment, the state display icon 2010 may be an icon indicating the authentication method set by the user. In this case, the authentication method currently performed by the electronic apparatus may not coincide with the authentication method indicated by the icon.

An electronic apparatus may include a first camera having a first field of view (FOV) and disposed on one surface of the electronic apparatus, a second camera having a second FOV included in the first FOV and disposed on the one surface, and a processor. The processor may be configured to obtain a request associated with biometric authentication, to obtain at least one first image corresponding to the first FOV by using the first camera, based at least on the request, to obtain at least one second image corresponding to the second FOV by using the second camera, based at least on the request, to identify a first external object associated with the biometric authentication among one or more external objects included in the at least one first image, while obtaining the at least one first image, and to provide notification information for obtaining the at least one second image including the second external object while obtaining the at least one second image, when a second external object, which is at least part of the first external object and which is associated with the biometric authentication, is not included in the at least one second image.

According to an embodiment, while obtaining the at least one second image, the processor may be configured to perform authentication using at least part of the at least one second image when the second external object is included in the at least one second image and satisfies a condition associated with a distance, and to provide notification information associated with the distance when the second external object associated with the biometric authentication, which is at least part of the first external object, is included in the at least one second image and does not satisfy the condition associated with the distance.

According to an embodiment, the first camera may include a complementary metal oxide semiconductor (CMOS) sensor or a charge-couple device (CCD) sensor, and the second camera may include an infrared ray image sensor.

According to an embodiment, the processor may be configured to identify the distance between at least one external object of the first external object or the second external object and the electronic apparatus and to provide a notification associated with the distance such that the at least one external object is positioned within the specified distance range from the electronic apparatus while the at least one external object is positioned out of a specified distance range from the electronic apparatus.

According to an embodiment, the processor may be configured to determine the distance based at least on a width between a left eye and a right eye corresponding to the at least one external object, as at least part of an operation of identifying the distance.

According to an embodiment, the processor may be configured to determine the distance based at least on a size of the at least one external object, as at least part of an operation of identifying the distance.

According to an embodiment, the processor may be configured to identify the distance based on the at least one first image and the at least one second image.

According to an embodiment, the first external object may be at least one of an iris, an eyeball, or a face, and the second external object may be at least one of the iris, the eyeball, or the face.

According to an embodiment, the electronic apparatus may further include a display. The processor may be configured to display the notification information in a form of a text or an image, on the display.

According to an embodiment, the processor may be configured to identify a location of at least one external object of the first external object or the second external object with respect to the electronic apparatus and to provide notification information associated with the location such that the at least one external object is positioned within the specified location range from the electronic apparatus while the at least one external object is positioned out of a specified location range from the electronic apparatus.

An electronic apparatus may include a first camera having a first FOV and disposed on one surface of the electronic apparatus, a second camera having a second FOV different from the first FOV and disposed on the one surface and a processor. The processor may be configured to obtain a request associated with biometric authentication, in response to the request, to obtain a first image by using the first camera and recognize a first external object associated with biometric authentication in the first image, in response to the request, to obtain a second image by using a second camera and try to recognize a second external object associated with the biometric authentication in the second image, and when the recognition of the second external object in the second image fails, to provide notification information associated with the first external object.

According to an embodiment, the processor may be configured to obtain a third image including the second external object, using the second camera, to identify the second external object in the third image, and to perform authentication, using a part of the third image.

According to an embodiment, the first camera may have a FOV of a range wider than the second camera.

According to an embodiment, the first camera may include a CMOS sensor or a CCD sensor, and the second camera may include an infrared ray image sensor.

According to an embodiment, the processor may be configured to obtain a fourth image, using the second camera, to try to identify the second external object within the fourth image, when the recognition of the second external object fails, to obtain a distance between the electronic apparatus and the first external object or the second external object, and to provide a notification associated with the distance based on the distance between the electronic apparatus and at least one external object.

According to an embodiment, an electronic apparatus may include a first camera having a first FOV and disposed on one surface of the electronic apparatus, a second camera having a second FOV included within the first FOV and disposed on the one surface, and a processor. The processor may be configured to obtain a request associated with biometric authentication, to obtain at least one first image corresponding to the first FOV by using the first camera, based at least on the request, to obtain at least one second image corresponding to the second FOV by using the second camera, based at least on the request, to identify a first external object associated with the biometric authentication among one or more external objects included in the at least one first image, while obtaining the at least one first image, and while obtaining the at least one second image, when a second external object, which is at least part of the first external object and which is associated with the biometric authentication, is not included in the at least one second image, to provide notification information associated with at least one external object of the first external object or the second external object.

According to an embodiment, while obtaining the at least one second image, when the second external object is included in the at least one second image and satisfies a condition associated with a distance, the processor may be configured to perform authentication using at least part of the at least one second image and when the second external object associated with the biometric authentication, which is at least part of the first external object, is included in the at least one second image and does not satisfy the condition associated with the distance, to provide notification information associated with the distance.

According to an embodiment, the processor may be configured to identify the distance between at least one external object of the first external object or the second external object and the electronic apparatus and while the at least one external object is positioned out of a specified distance range from the electronic apparatus, to provide notification information associated with the distance.

According to an embodiment, the processor may be configured to determine the distance based at least on a width between a left eye and a right eye corresponding to the at least one external object, as at least part of an operation of identifying the distance.

According to an embodiment, the first camera may include a complementary metal oxide semiconductor (CMOS) sensor or a charge-couple device (CCD) sensor, and the second camera may include an infrared ray image sensor.

Figure 21:
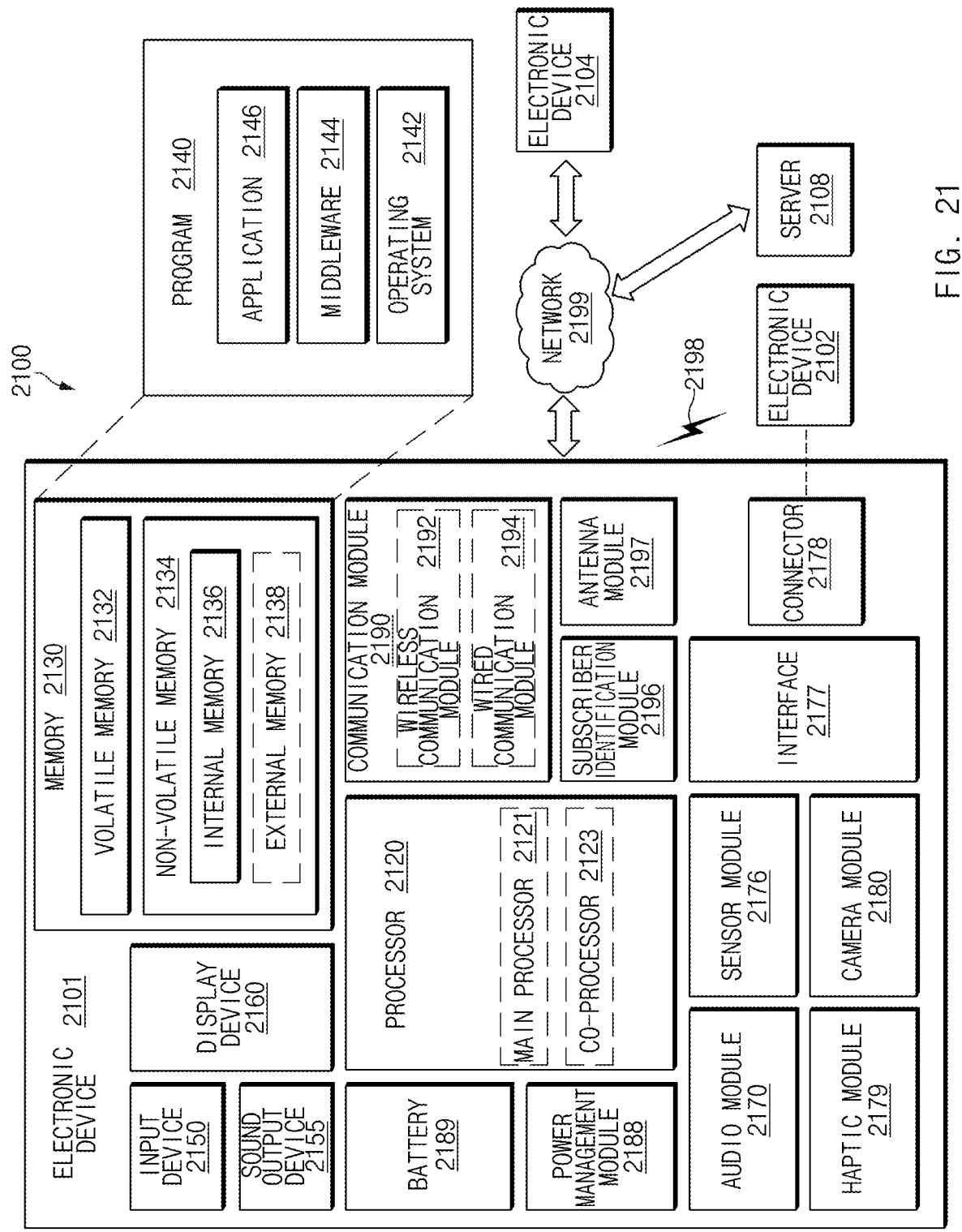
FIG. 21 illustrates a block diagram of an electronic device in a network environment according to various embodiments.

FIG. 21 is a block diagram illustrating an electronic device 2101 in a network environment 2100 according to various embodiments. Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 2101. In some embodiments, some of the components may be implemented as single integrated circuitry. For example, the sensor module 2176 (e.g., a fingerprint sensor, an iris sensor, or an illuminance sensor) may be implemented as embedded in the display device 2160 (e.g., a display).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 2121. Additionally or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display device 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by other component (e.g., the processor 2120) of the electronic device 2101, from the outside (e.g., a user) of the electronic device 2101. The input device 2150 may include, for example, a microphone, a mouse, or a keyboard.

The sound output device 2155 may output sound signals to the outside of the electronic device 2101. The sound output device 2155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain the sound via the input device 2150, or output the sound via the sound output device 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector), The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 2101. According to an embodiment, the antenna module 2197 may include one or more antennas, and, therefrom, at least one antenna appropriate for a communication scheme used in the communication network, such as the first network 2198 or the second network 2199, may be selected, for example, by the communication module 2190 (e.g., the wireless communication module 2192). The signal or the power may then be transmitted or received between the communication module 2190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

According to the conventional technology, an electronic apparatus may not provide a feedback associated with the state of a specified object, when the specified object is not positioned within the recognition range of a camera used for biometric authentication. For example, it may be difficult to provide the feedback (location correction, or position correction) based on the location and/or distance of a specified object.

Since the biometric authentication is sensitive to an external environment (e.g., user motion or illumination), the recognition rate of an object may vary greatly depending on the external environment. According to the conventional technology, once the authentication method is set, the electronic apparatus performs authentication only using the corresponding authentication method, and thus the convenience of authentication is degraded depending on the external environment.

Aspects of the present disclosure are to address at least the above-mentioned problems and/or disadvantages and to provide at least the advantages described below. Accordingly, an aspect of the present disclosure is to provide a method, in which an electronic apparatus performs biometric authentication or provides a user with a feedback in various situations using a plurality of cameras, and an electronic apparatus using the same.

According to various embodiments of the present disclosure, an electronic apparatus may improve user convenience by providing the feedback associated with the state of a specified object.

According to various embodiments of the present disclosure, an electronic apparatus may efficiently perform biometric authentication by adaptively using a plurality of authentication methods.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:
    a first camera, having a first field of view (FOV), disposed on a surface of the electronic apparatus;
    a second camera, having a second FOV corresponding to a part of the first FOV, disposed on the surface, the second FOV being narrower than the first FOV; and
    a processor, connected to the first camera and the second camera, configured to:
        obtain a request associated with biometric authentication,
        obtain, based on the request, at least one first image using the first camera and at least one second image using the second camera,
        while obtaining the at least one first image, provide a first notification indicating that a first external object is not identified based on a determination that the first external object is not identified from the at least one first image, the first external object being associated the biometric authentication, and
        while obtaining the at least one second image, provide a second notification including guide information for positioning a second external object in the second FOV based on a determination that the first external object is identified from the at least one first image and the second external object is not identified from the at least one second image, the second external object corresponding to a part of the first external object,
        wherein the guide information comprises at least one of a movement upward, a movement downward, a movement to left, or a movement to right, and the guide information is determined based on the first external object identified from the at least one first image.

2. The electronic apparatus of claim 1, wherein while obtaining the at least one second image, the processor is further configured to:
    when the second external object is identified from the at least one second image and satisfies a condition associated with a distance, perform the biometric authentication using a part of the at least one second image; and
    when the second external object is identified from the at least one second image and does not satisfy the condition associated with the distance, provide notification information associated with the distance.

3. The electronic apparatus of claim 1, wherein:
    the first camera includes a complementary metal oxide semiconductor (CMOS) sensor or a charge-couple device (CCD) sensor; and
    the second camera includes an infrared ray image sensor.

4. The electronic apparatus of claim 2, wherein the processor is further configured to:
   identify the distance between the electronic apparatus and at least one object of the first external object or the second external object; and
   while the at least one object is positioned out of a specified distance range from the electronic apparatus, provide a notification associated with the distance indicating that the at least one object is positioned out of the specified distance range from the electronic apparatus.

5. The electronic apparatus of claim 4, wherein the processor is further configured to identify the distance based on a width between a left eye and a right eye, corresponding to the at least one object.

6. The electronic apparatus of claim 4, wherein the processor is further configured to identify the distance based on a size of the at least one object.

7. The electronic apparatus of claim 4, wherein the processor is further configured to identify the distance based on the at least one first image and the at least one second image.

8. The electronic apparatus of claim 1, wherein:
   the first external object is a face; and
   the second external object is at least one of an iris or an eyeball.

9. The electronic apparatus of claim 1, further comprising a display, wherein the processor is further configured to display the second notification on the display.

10. The electronic apparatus of claim 1, wherein the processor is further configured to:
    identify a location of at least one object of the first external object or the second external object; and
    while the at least one object is positioned out of a specified location range from the electronic apparatus, provide notification information associated with the location in which the at least one object is positioned within the specified location range from the electronic apparatus.

11. An electronic apparatus comprising:
    a first camera, having a first field of view (FOV), disposed on a surface of the electronic apparatus;
    a second camera, having a second FOV corresponding to a part of the first FOV, disposed on the surface, the second FOV being narrower than the first FOV; and
    a processor, connected to the first camera and the second camera, configured to:
        obtain a request associated with biometric authentication,
        in response to obtaining the request, obtain a first image using the first camera and a second image using the second camera,
        provide a first notification indicating that a first external object is not identified based on a determination that the first external object associated with the biometric authentication is not identified from the first image, and
        provide a second notification including guide information based on a determination that the first external object is identified from the first image and a second external object is not identified from the second image, the second external object corresponding to a part of the first external object,
        wherein the guide information comprises at least one of a movement upward, a movement downward, a movement to left, or a movement to right, and the guide information is determined based on the first external object identified from at least one first image.

12. The electronic apparatus of claim 11, wherein the processor is further configured to:
    obtain, using the second camera, a third image including the second external object;
    identify the second external object in the third image; and
    perform the biometric authentication using a portion of the third image.

13. The electronic apparatus of claim 11, wherein:
    the first camera includes a complementary metal oxide semiconductor (CMOS) sensor or a charge-couple device (CCD) sensor; and
    the second camera includes an infrared ray image sensor.

14. The electronic apparatus of claim 11, wherein the processor is further configured to:
    obtain a fourth image using the second camera;
    perform object recognition to identify the second external object within the fourth image;
    when the object recognition fails to recognize the second external object within the fourth image, obtain a distance between the electronic apparatus and at least one object of the first external object or the second external object; and
    provide a notification associated with the distance between the electronic apparatus and at least one object of the first external object or the second external object.

* * * * *